(12) United States Patent
Dang et al.

(10) Patent No.: US 10,635,565 B2
(45) Date of Patent: Apr. 28, 2020

(54) SYSTEMS AND METHODS FOR ROBUST ANOMALY DETECTION

(71) Applicant: ServiceNow, Inc., Santa Clara, CA (US)

(72) Inventors: Kanwaldeep K. Dang, Sammamish, WA (US); Purushottam Amradkhar, Sammamish, WA (US); James Crotinger, Kirkland, WA (US); Stephen Scott Tucker, Kirkland, WA (US); Dustin Lennon, Seattle, WA (US)

(73) Assignee: ServiceNow, Inc., Santa Clara, CA (US)

( * ) Notice: Subject to any disclaimer, the term of this patent is extended or adjusted under 35 U.S.C. 154(b) by 217 days.

(21) Appl. No.: 15/815,142

(22) Filed: Nov. 16, 2017

(65) Prior Publication Data

US 2019/0102276 A1 Apr. 4, 2019

Related U.S. Application Data

(60) Provisional application No. 62/568,087, filed on Oct. 4, 2017.

(51) Int. Cl.
*G06F 11/34* (2006.01)
*G06F 11/30* (2006.01)
(Continued)

(52) U.S. Cl.
CPC ...... *G06F 11/3452* (2013.01); *G06F 11/3072* (2013.01); *G06F 11/323* (2013.01);
(Continued)

(58) Field of Classification Search
CPC ............ G06F 11/3452; G06F 11/3072; G06F 11/323; G06F 11/3409; G06F 11/3419;
(Continued)

(56) References Cited

U.S. PATENT DOCUMENTS 5,105,372 A * 4/1992 Provost .................... G07C 3/00
324/378
7,062,683 B2 6/2006 Warpenburg
(Continued)

FOREIGN PATENT DOCUMENTS

EP 0315307 A2 5/1989

OTHER PUBLICATIONS

Viswanathan K., et al.: "Ranking anomalies in data centers", 2012 IEEE Network Operations and management Symposium (NOMS 2012), Apr. 16, 2012, pp. 79-87, XP032448637.
(Continued)

*Primary Examiner* — Yolanda L Wilson
(74) *Attorney, Agent, or Firm* — Fletcher Yoder PC

(57) ABSTRACT

A system, includes: a distributed cache that stores state information for a plurality of configuration items (CIs). Management, instrumentation, and discovery (MID) servers form a cluster, each of the MID servers including one or more processors that receive, from the distributed cache, a subset of the state information associated with assigned CIs and perform a statistical analysis on the subset of the state information.

12 Claims, 18 Drawing Sheets

(51) Int. Cl.
  *G06K 9/62* (2006.01)
  *G06F 17/18* (2006.01)
  *H04L 29/08* (2006.01)
  *G06F 11/32* (2006.01)

(52) U.S. Cl.
  CPC ...... *G06F 11/3409* (2013.01); *G06F 11/3419* (2013.01); *G06F 17/18* (2013.01); *G06K 9/6278* (2013.01); *G06K 9/6284* (2013.01); *H04L 67/1097* (2013.01)

(58) Field of Classification Search
  CPC .. H04L 67/1097; H04L 43/0823; H04L 41/06
  See application file for complete search history.

(56) References Cited

U.S. PATENT DOCUMENTS

| | | | |
|---|---|---|---|
| 7,610,512 B2 | 10/2009 | Gerber | |
| 7,617,073 B2 | 11/2009 | Trinon | |
| 7,817,563 B1* | 10/2010 | Buragohain | G06F 11/3419 370/241 |
| 7,890,802 B2 | 2/2011 | Gerber | |
| 7,945,860 B2 | 5/2011 | Vambenepe | |
| 7,966,398 B2 | 6/2011 | Wiles | |
| 8,224,683 B2 | 7/2012 | Manos | |
| 8,674,992 B2 | 3/2014 | Poston | |
| 9,054,942 B1* | 6/2015 | De Temmerman | H04L 43/045 |
| 9,356,846 B2 | 5/2016 | Cremonesi et al. | |
| 9,509,710 B1* | 11/2016 | Barry | H04L 63/1425 |
| 10,129,118 B1* | 11/2018 | Ghare | H04L 63/1425 |
| 2008/0281958 A1* | 11/2008 | McKinnon | G06F 9/5027 709/224 |
| 2011/0307552 A1* | 12/2011 | Sarmah | G06F 9/4856 709/204 |
| 2014/0096146 A1* | 4/2014 | Maor | G06F 11/3419 719/318 |
| 2014/0310235 A1* | 10/2014 | Chan | G06F 9/4881 707/603 |
| 2016/0147583 A1* | 5/2016 | Ben Simhon | G06F 11/076 714/47.3 |
| 2016/0350173 A1* | 12/2016 | Ahad | G06F 11/3495 |
| 2017/0017902 A1* | 1/2017 | Razin | G06F 9/45533 |
| 2017/0132068 A1* | 5/2017 | Parra | G06F 11/3409 |

OTHER PUBLICATIONS

Extended European Search Report for European Application No. 18198533.4, dated Mar. 8, 2019; 15 pgs.

* cited by examiner

SYSTEMS AND METHODS FOR ROBUST ANOMALY DETECTION

CROSS-REFERENCE TO RELATED APPLICATION(S)

This application claims the benefit of U.S. Provisional Application No. 62/568,087, filed Oct. 4, 2017, the entire contents of which are hereby incorporated by reference in its entirety.

TECHNICAL FIELD

The present disclosure relates in general to systems, methods, and apparatuses for anomaly detection in time-series data. More specifically, the present disclosure is related to systems and methods for classifying and scoring time-series data to identify relative levels of anomaly in the time-series data, for subsequent reporting and action.

BACKGROUND

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Computer resources hosted in distributed computing (e.g., cloud-computing) environments may be disparately located with different resources potentially having their own functions, properties, and/or permissions. Such resources may include hardware resources (e.g. computing devices, switches, etc.) and software resources (e.g. database applications). These resources may be used to collect and store data at various times related to a variety of measurable properties, including network, hardware, or database performance properties measured at different times. As systems for collecting data become more readily available and the costs for storage hardware continue to decrease, the amount of data that these computer resources are capable of collecting is increasing. For instance, in addition to collecting raw data more frequently, metadata associated with the time in which the raw data has been generated or acquired may also be stored for a given data set.

Although the capabilities of computer resources for collecting and storing more data continues to expand, the vast amount of collected data may prove to be difficult to interpret and synthesize. That is, to draw inferences from the data that may be useful to the operation of the computer resources, the operation of a business, or the like, it may be useful to interpret the data in different manners, based upon particular characteristics of the data. The interpretation may be used to determine a magnitude of likely anomalous data (e.g., an anomalous score for the data), which may be used to report anomalies within the system, enabling enhanced monitoring and sustainment of the system.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Information Technology (IT) networks may include a number of computing devices, server systems, databases, and the like that generate, collect, and store information at various time intervals. By collecting data at various times, temporal analysis may be performed on the collected data to gain insight into a relationship between certain events that occur at specific times and the properties (e.g., collected data) of monitored components during these events. However, as data is collected over time, it is increasingly difficult to manage or synthesize the collected data to gain insight into various issues or problems that may be associated with certain devices or components of a given IT network due to the amount of collected data.

With this in mind, an IT system may use historical data relating to time-series data to classify the time-series data based upon one or more data patterns of the time-series data. An underlying statistical model representative of the time-series data may be constructed based upon the relevant classifications. For example, the underlying statistical model may take into account trends, seasonality, and/or other patterns that may be relevant to predicting expected subsequent time-series data values. As additional time-series data is received, it is compared with the underlying statistical model to identify statistical outliers in the time-series data. The statistical outliers are attributed an anomalous score, indicating an attributed magnitude of anomaly for the statistical outlier. The anomalous scores for the statistical outliers are then provided via the system, enabling anomaly reporting and/or remedial action.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

The description herein makes reference to the accompanying drawings, wherein like reference numerals refer to like parts throughout the several views.

DETAILED DESCRIPTION

Figure 1:
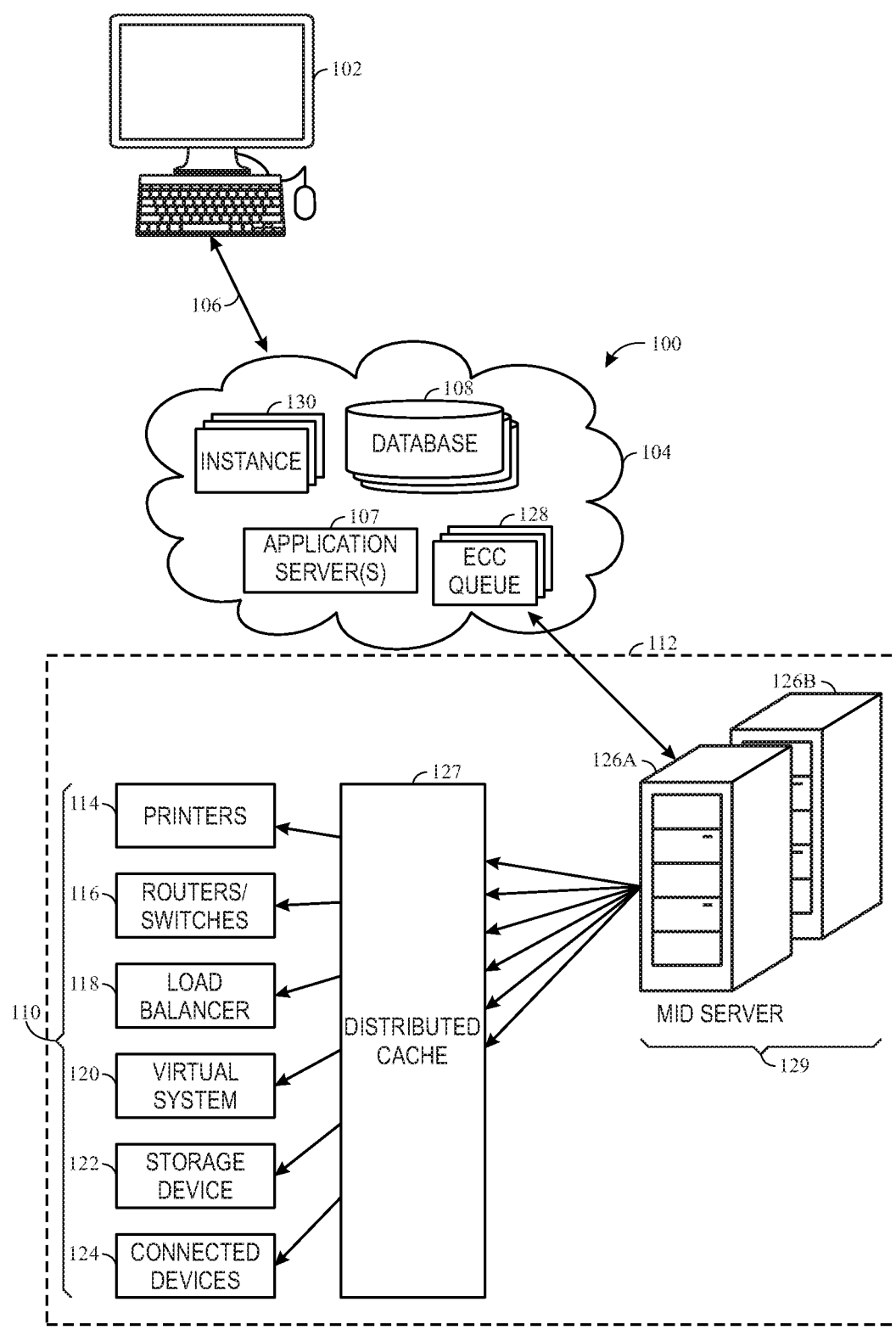
FIG. 1 is a block diagram of a generalized distributed computing system utilizing a cloud service and a configuration management database (CMDB), in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Information Technology (IT) devices are increasingly important in an electronics-driven world in which various electronics devices are interconnected within a distributed context. As more functions are performed by services using some form of distributed computing, the complexity of IT network management increases. As these devices are separated geospatially, managing and tracking configuration of these devices may become more difficult.

In such an interconnected but distributed context, the configuration of each of these devices may be represented by configuration items (CIs) that detail certain configurations, parameters, components, software, or settings associated with a respective device. As will be discussed in greater detail below, CIs may include information related to a physical entity (e.g., hardware), a logical entity (e.g., version, instance of a database), a conceptual entity (e.g., service), and the like associated with a respective device. Given the wide variety of CIs associated with various devices within this type of complex IT environment, configuration item (CI) discovery executed on a given infrastructure is used to track the CIs of the devices that are present on the connected IT environment. That is, CI discovery is the process of finding configuration items, such as hardware, software, documentation, location, and other information related to the devices connected to a given network, such as an enterprise's network. This discovery process may be performed at least partially using automated routines, e.g., an application program, running on the network in question. When a CI is found by such routines, discovery includes exploring some or all of the CI's configuration, provisioning, and current status. This explored information is used to update one or more databases, such as a configuration management database (CMDB), accordingly.

The CMDB stores and tracks the discovered CIs connected to the network. Such information stored on the CMDB may then be used by other applications and/or by IT personnel in managing or using the resources on the network. On computer systems, the discovery process may identify CIs such as software applications running on discovered devices, and any connections, such as Transmission Control Protocol (TCP) connections between discovered devices. Discovery may also be used to track the relationships between computer systems, such as an application program running on one server that utilizes a database stored on another server. CI discovery may be performed at initial installation or instantiation of connections or new devices, and/or CI discovery may be scheduled to occur periodically to track additions, removals, or changes to the IT devices being managed, thereby keeping data stored on the CMDB. Thus, using an ongoing discovery process, an up-to-date map of devices and their infrastructural relationships may be maintained.

In view of such ongoing discovery processes, as well as other routine or constant processes that generate operational or procedural data, IT networks may include server systems that acquire and store data (e.g., time-series data) related to a number of measurable properties. For example, for a given computer system, data regarding performance of computer resources (e.g., central processing unit, disk, memory transaction count), instance cache size, code performance data (e.g., business rules count, cache size), large record counts (e.g., open incidents, tests), and the like may be stored at various times in a database (e.g., time-series database) accessible to a server system. As the amount of stored data increase, along with date/time stamps regarding when the data was acquired, it becomes increasingly difficult to analyze the stored data to identify subsets of the data that may be relevant to a particular issue or problem.

Generally, time-series data may include data acquired at various times and stored in a database (e.g., a time-series database). Since the time-series data is acquired multiple times, the amount of raw data that makes up the time-series data can be difficult to sort through and analyze due to its size. However, time-series data can provide valuable insight with regard to trends and/or correlations related to certain events. For instance, performance properties (e.g., CPU usage, memory usage) of a computer system may be tracked and stored as time-series data, allowing such performance properties to be analyzed over time, over a limited window of time, or in view of various periodic or time based conditions (e.g., CPU usage every third Friday or on the 15th of each month) that may be otherwise difficult to perceive.

Anomalies within this time-series data may indicate a problem within the system. For example, when looking at performance properties, such as CPU usage, memory usage, etc., anomalous spikes in these properties may indicate failing hardware, malicious activities, and so forth. Accordingly, it may be desirable to monitor anomalies in time-series data to detect an existing issue or to diagnose issues at an early stage, such that remedial measures, such as anomaly reporting, hardware replacement, etc. may be performed. However, given the vast amount of time-series data representing multitudes of measurable properties, anomaly detection may be difficult, especially considering other data changing patterns that may arise in certain types of data. False anomaly detection may lead to false reporting, which may desensitize users to anomaly reports and/or lead to unnecessary maintenance or remedial operations being performed.

With this in mind, in one embodiment, an application server may receive a relational time-series query request that is directed to identifying and/or analyzing certain specified relational data based at least in part on date and time characteristics. Thus, the relational time-series query request may include a relational component that analyzes time-series data according to one or more classifications and/or classification models attributed to the time-series data.

More specifically, accumulated time-series data may be analyzed to classify the time-series data by one or more qualitative classifications. The classifications may be used to generate a statistical model of the time-series data, which may help to identify anomalies (e.g., outlier data that falls outside of upper and/or lower bounds of the statistical model). Anomalous scores for the time-series data may be generated based at least in part upon an accumulation of anomalies over a certain dynamically-adjustable window of time.

By leveraging these anomalous scores, a simple, yet easily understandable indication of anomalies within the IT system may be provided. Further, by using an accumulation of anomalies over an adjustable time window as the basis for the anomalous score, increased accuracy may be obtained. That is, instead of relying on a static window of time, the time window may be adjusted based upon a variety of factors. For example, in one embodiment, the time window may be adjusted to be relatively longer when a probability of the time-series data falling in a normal range is low. This may extend the monitoring window, such that even slight anomalies are monitored, when there is a low probability that the time-series data falls into a normal range. In such embodiments, the time window may also be adjusted to be relatively shorter when the probability of the time-series data falling in a normal range is high. Additional details regarding time-series data anomaly detection techniques are provided below with reference to FIGS. 1-16.

By way of introduction to the present concepts and to provide context for the examples discussed herein, FIG. 1 is a block diagram of a system 100 that utilizes a distributed computing framework, which may perform one or more of the techniques described herein. As illustrated in FIG. 1, a client 102 communicates with a cloud service 104 over a communication channel 106. The client 102 may include any suitable computing system. For instance, the client 102 may include one or more computing devices, such as a mobile phone, a tablet computer, a laptop computer, a notebook computer, a desktop computer, or any other suitable computing device or combination of computing devices. The client 102 may include client application programs running on the computing devices. The client 102 can be implemented using a single physical unit or a combination of physical units (e.g., distributed computing) running one or more client application programs. Furthermore, in some embodiments, a single physical unit (e.g., server) may run multiple client application programs simultaneously.

The cloud service 104 may include any suitable number of computing devices (e.g., computers) in one or more locations that are connected together using one or more networks. For instance, the cloud service 104 may include various computers acting as servers in datacenters at one or more geographic locations where the computers communicate using network and/or Internet connections. The communication channel 106 may include any suitable communication mechanism for electronic communication between the client 102 and the cloud service 104. The communication channel 106 may incorporate local area networks (LANs), wide area networks (WANs), virtual private networks (VPNs), cellular networks (e.g., long term evolution networks), and/or other network types for transferring data between the client 102 and the cloud service 104. For example, the communication channel 106 may include an Internet connection when the client 102 is not on a local network common with the cloud service 104. Additionally or alternatively, the communication channel 106 may include network connection sections when the client and the cloud service 104 are on different networks or entirely using network connections when the client 102 and the cloud service 104 share a common network. Although only a single client 102 is shown connected to the cloud service 104, it should be noted that cloud service 104 may connect to multiple clients (e.g., tens, hundreds, or thousands of clients).

Through the cloud service 104, the client 102 may connect to various devices with various functionality, such as gateways, routers, load balancers, databases, application servers running application programs on one or more nodes, or other devices that may be accessed via the cloud service 104. For example, the client 102 may connect to an application server 107 and/or one or more databases 108 via the cloud service 104. The application server 107 may include any computing system, such as a desktop computer, laptop computer, server computer, and/or any other computing device capable of providing functionality from an application program to the client 102. The application server 107 may include one or more application nodes running application programs whose functionality is provided to the client via the cloud service 104. The application nodes may be implemented using processing threads, virtual machine instantiations, or other computing features of the application server 107. Moreover, the application nodes may store, evaluate, or retrieve data from the databases 108 and/or a database server.

The databases 108 may contain a series of tables containing information about assets and business services controlled by a client 102 and the configurations of these assets and services. The assets and services include configuration items (CIs) 110 that may be computers, other devices on a network 112 (or group of networks), software contracts and/or licenses, or business services. The CIs 110 may include hardware resources (such as server computing devices, client computing devices, processors, memory, storage devices, networking devices, or power supplies); software resources (such as instructions executable by the hardware resources including application software or firmware); virtual resources (such as virtual machines or virtual storage devices); and/or storage constructs (such as data files, data directories, or storage models). As such, the CIs 110 may include a combination of physical resources or virtual resources. For example, the illustrated embodiment of the CIs 110 includes printers 114, routers/switches 116, load balancers 118, virtual systems 120, storage devices 122, and/or other connected devices 124. The other connected devices 124 may include clusters of connected computing devices or functions such as data centers, computer rooms, databases, or other suitable devices. Additionally or alternatively, the connected devices 124 may include facility-controlling devices having aspects that are accessible via network communication, such as heating, ventilation, and air conditioning (HVAC) units, fuel tanks, power equipment, and the like. The databases 108 may include information related to CIs 110, attributes (e.g., roles, characteristics of elements, etc.) associated with the CIs 110, and/or relationships between the CIs 110.

In some embodiments, the databases 108 may include a configuration management database (CMDB) that may store the data, e.g., time-series data, concerning CIs 110 mentioned above along with data related various IT assets that may be present within the network 112. In addition to the databases 108, the cloud service 104 may include one or more other database servers. The database servers are configured to store, manage, or otherwise provide data for delivering services to the client 102 over the communication channel 106. The database server may include one or more additional databases that are accessible by the application server 107, the client 102, and/or other devices external to the additional databases. By way of example, the additional databases may include a relational database and a time-series database, which will be discussed in greater detail below. The additional databases may be implemented and/or managed using any suitable implementations, such as a relational database management system (RDBMS), a time-series database management system, an object database, an extensible markup language (XML) database, a configuration management database (CMDB), a management information base (MIB), one or more flat files, and/or or other suitable non-transient storage structures. In some embodiments, more than a single database server may be utilized. Furthermore, in some embodiments, the cloud service 104 may have access to one or more databases external to the cloud service 104 entirely.

In the depicted topology, access to the CIs 110 from the cloud service 104 is enabled via a management, instrumentation, and discovery (MID) server 126A or 126B via an External Communications Channel (ECC) Queue 128. The MID server 126A or 126B may include an application program (e.g., Java application) that runs as a service (e.g., Windows service or UNIX daemon) that facilitates communication and movement of data between the cloud service 104 and external applications, data sources, and/or services. The MID server 126A or 126B service may be executed using a computing device (e.g., server or computer) on the network 112 that communicates with the cloud service 104. As discussed below, the MID server 126A or 126B may periodically or intermittently use discovery probes to determine information on devices connected to the network 112 and return the probe results back to the cloud service 104. In the illustrated embodiment, the MID server 126A or 126B is located inside the network 112 thereby alleviating the use of a firewall in communication between the CIs 110 and the MID server 126A or 126B. However, in some embodiments, a secure tunnel may be generated between a MID server 126A or 126B running in the cloud service 104 that communicates with a border gateway device of the network 112.

For large topologies, a vast amount of data may be captured and processed by the MID server 126A or 126B. Accordingly, in some embodiments, such as the embodiment depicted in FIG. 1, multiple MID servers (e.g., 126A and 126B) may form a cluster 129. The cluster 129 may be used to process incoming data from the CIs 110. The MID servers (e.g., 126A and 126B) of the cluster 129 may communicate with each other over a communications protocol (e.g., Transmission Control Protocol (TCP)), enabling an assignment of CI 110 metric data processing to be communicated amongst the multiple MID servers (e.g., 126A and 126B) of the cluster 129.

In the depicted embodiment, metric data of the CIs 110 are provided to the distributed cache 127. The metric data includes a CI 110 unique identifier that identifies which CI 110 is associated with the metric data. As will be discussed in more detail below, processing of a first subset of CI 110 metric data may be assigned to a first MID server 126A of the cluster 129 and processing of a second subset of CI 110 metric data may be assigned to a second MID server 126B of the cluster 129. Accordingly, as CI 110 metrics are received, the received metric data may be stored in the distributed cache 127, which is accessible by each of the MID servers 126A and 126B. Subsets of the metric data are then read out to the proper MID servers 126A and/or 126B that are assigned to process the subset of metric data (e.g., a first subset of metric data assigned for processing by the MID server 126A is read out to MID server 126A and a second subset of metric data assigned for processing by the MID server 126B is read out to MID server 126B). For example, the distributed cache 127 may be aware of the CI 110 metric data processing assignments for the various MID servers 126 and 126B of the cluster 129. The distributed cache 127 may push the metric data to the proper MID server using the CI 110 IDs associated with the metric data.

Further, if a MID server 126A or 126B goes down or is otherwise unavailable, data redundancy features may be activated within the cluster 129. For example, the MID server 126B may be re-assigned to process CI 110 tasks previously assigned to MID server 126A when MID server 126A is not online. In such a circumstance, after re-assignment, the metric data that would have previously been read out to MID server 126A will automatically be read out to MID server 126B. Additionally, the MID server 126B may access data previously read out to the MID server 126A using the CI 110 IDs of the reassigned CIs 110, enabling anomaly detection at the newly assigned MID server 126B.

The ECC queue 128 may be a database table that is typically queried, updated, and inserted into by other systems. Each record in the ECC queue 128 is a message from an Instance 130 in the cloud service 104 to a system (e.g., MID server 126A or 126B) external to the cloud service 104 that connects to the cloud service 104 or a specific Instance 130 running in the cloud service 104 or a message to the Instance 130 from the external system. The fields of an ECC queue 128 record include various data about the external system or the message in the record.

As will be discussed in more detail below, the MID server 126A or 126B may also facilitate anomaly detection for time-series data (e.g., related to the CIs 110). In particular, the MID server 126A or 126B (or a separate time-series database server) may classify time-series data based upon data patterns/trends of historical time-series data. The MID server 126A or 126B may generate and provide a model for the time-series data, which may be used to determine an expected range for subsequent time-series data or otherwise used to detect that a sequence of time-series data points are highly unlikely. The MID server 126A or 126B may accumulate time-series data outside of the expected range and generate an anomalous score for the time-series data, which may be provided to an active Instance 130 for subsequent remedial action/reporting.

Although the system 100 is described as having the application servers 107, the databases 108, the ECC queue 128, the MID server 126A or 126B, and the like, it should be noted that the embodiments disclosed herein are not limited to the components described as being part of the system 100. Indeed, the components depicted in FIG. 1 are merely provided as example components and the system 100 should not be limited to the components described herein. Instead, it should be noted that other types of server systems (or computer systems in general) may communicate with the cloud service 104 in addition to the MID server 126A or 126B and/or may be used to implement the present approach.

Further, it should be noted that server systems described herein may communicate with each other via a number of suitable communication protocols, such as via wired communication networks, wireless communication networks, and the like. In the same manner, the client 102 may communicate with a number of server systems via a suitable communication network without interfacing its communication via the cloud service 104.

In addition, other methods for populating the databases 108 may include directly importing the CIs or other entries from an external source, manual import by users entering CIs or other entries via a user interface, and the like. Moreover, although the details discussed above are provided with reference to the CMDB, it should be understood that the embodiments described herein should not be limited to being performed with the CMDB. Instead, the present systems and techniques described herein may be implemented with any suitable database.

Figure 2:
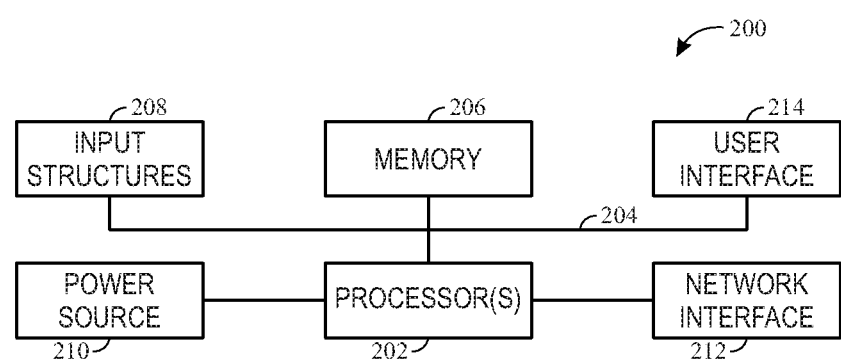
FIG. 2 is a block diagram of a computing device utilized in the distributed computing system of FIG. 1, in accordance with an embodiment.

In any case, to perform one or more of the operations described herein, the client 102, the application servicer 107, the MID server 126A or 126B, and other server or computing system described herein may include one or more of the computer components depicted in FIG. 2. FIG. 2 generally illustrates a block diagram of example components of a computing device 200 and their potential interconnections or communication paths, such as along one or more busses. As briefly mentioned above, the computing device 200 may be an embodiment of the client 102, the application server 107, a database server (e.g., databases 108), other servers or processor-based hardware devices present in the cloud service 104 (e.g., server hosting the ECC queue 128), a device running the MID server 126A or 126B, and/or any of the CIs. As previously noted, these devices may include a computing system that includes multiple computing devices and/or a single computing device, such as a mobile phone, a tablet computer, a laptop computer, a notebook computer, a desktop computer, a server computer, and/or other suitable computing devices.

As illustrated, the computing device 200 may include various hardware components. For example, the device includes one or more processors 202, one or more busses 204, memory 206, input structures 208, a power source 210, a network interface 212, a user interface 214, and/or other computer components useful in performing the functions described herein.

The one or more processors 202 may include processor capable of performing instructions stored in the memory 206. For example, the one or more processors may include microprocessors, system on a chips (SoCs), or any other processors performing functions by executing instructions stored in the memory 206. Additionally or alternatively, the one or more processors 202 may include application-specific integrated circuits (ASICs), field-programmable gate arrays (FPGAs), and/or other devices designed to perform some or all of the functions discussed herein without calling instructions from the memory 206. Moreover, the functions of the one or more processors 202 may be distributed across multiple processors in a single physical device or in multiple processors in more than one physical device. The one or more processors 202 may also include specialized processors, such as a graphics processing unit (GPU).

The one or more busses 204 includes suitable electrical channels to provide data and/or power between the various components of the computing device. For example, the one or more busses 204 may include a power bus from the power source 210 to the various components of the computing device. Additionally, in some embodiments, the one or more busses 204 may include a dedicated bus among the one or more processors 202 and/or the memory 206.

The memory 206 may include any tangible, non-transitory, and computer-readable storage media. For example, the memory 206 may include volatile memory, non-volatile memory, or any combination thereof. For instance, the memory 206 may include read-only memory (ROM), randomly accessible memory (RAM), disk drives, solid state drives, external flash memory, or any combination thereof. Although shown as a single block in FIG. 2, the memory 206 can be implemented using multiple physical units in one or more physical locations. The one or more processor 202 accesses data in the memory 206 via the one or more busses 204.

The input structures 208 provide structures to input data and/or commands to the one or more processor 202. For example, the input structures 208 include a positional input device, such as a mouse, touchpad, touchscreen, and/or the like. The input structures 208 may also include a manual input, such as a keyboard and the like. These input structures 208 may be used to input data and/or commands to the one or more processors 202 via the one or more busses 204. The input structures 208 may alternative or additionally include other input devices. For example, the input structures 208 may include sensors or detectors that monitor the computing device 200 or an environment around the computing device 200. For example, a computing device 200 can contain a geospatial device, such as a global positioning system (GPS) location unit. The input structures 208 may also monitor operating conditions (e.g., temperatures) of various components of the computing device 200, such as the one or more processors 202.

The power source 210 can be any suitable source for power of the various components of the computing device 200. For example, the power source 210 may include line power and/or a battery source to provide power to the various components of the computing device 200 via the one or more busses 204.

The network interface 212 is also coupled to the processor 202 via the one or more busses 204. The network interface 212 includes one or more transceivers capable of communicating with other devices over one or more networks (e.g., the communication channel 106). The network interface may provide a wired network interface, such as Ethernet, or a wireless network interface, such an 802.11, Bluetooth, cellular (e.g., LTE), or other wireless connections. Moreover, the computing device 200 may communicate with other devices via the network interface 212 using one or more network protocols, such as Transmission Control Protocol/Internet Protocol (TCP/IP), power line communication (PLC), Wi-Fi, infrared, and/or other suitable protocols.

A user interface 214 may include a display that is configured to display images transferred to it from the one or more processors 202. The display may include a liquid crystal display (LCD), a cathode-ray tube (CRT), a light emitting diode (LED) display, an organic light emitting diode display (OLED), or other suitable display. In addition and/or alternative to the display, the user interface 214 may include other devices for interfacing with a user. For example, the user interface 214 may include lights (e.g., LEDs), speakers, and the like.

Figure 3:
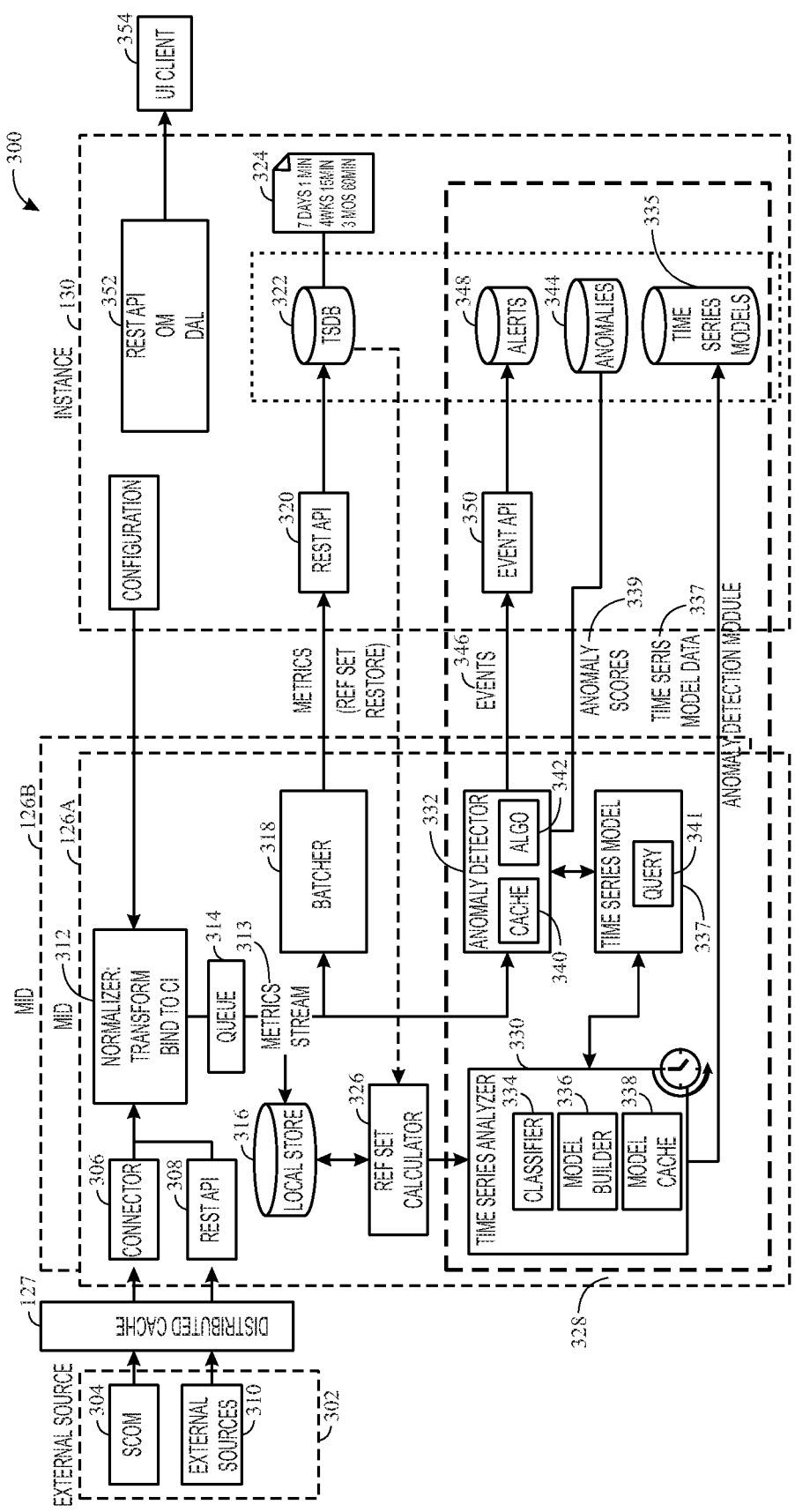
FIG. 3 is a block diagram of an example system that may be part of the distributed computing system of FIG. 1, in accordance with an embodiment.

With the foregoing in mind, FIG. 3 illustrates a distributed computing system 300, in accordance with an embodiment. As mentioned above with regard to FIG. 1, the system 300 includes a MID server 126A or 126B communicatively coupled to Instance 130 (e.g., running in the cloud 104 of FIG. 1). Additionally, in the current embodiment, external sources 302 are present. The external sources provide time-series data, which may indicate metrics for services, devices, and operations (e.g., the CIs 110 of FIG. 1). For example, operations management software, such as System Center—Operations Manager (SCOM) 304 may be communicatively coupled to a distributed cache 127 communicatively coupled to the connector logic 306 of the MID server 126A and/or 126B, enabling the MID server 126A and/or 126B to pull metric data for many computers, services, etc. from a single console. Additionally, in the current embodiment, the MID server 126A or 126B hosts a Representational State Transfer (REST) application-programming-interface (API) 308, which enables additional external sources 310 to push metric data regarding the CIs to the MID server 126A and/or 126B from the distributed cache 127.

As mentioned above, once the metric data is received at the distributed cache 127, a determination as to the relevant MID server 126A and/or 126B of the cluster 129 that is assigned to process the metric data may be determined using a CI 110 processing assignment and CI 110 IDs associated with the metric data (e.g., via the distributed cache 127). The distributed cache 127 may forward the metric data to relevant MID server 126A and/or 126B (e.g., by reading out the data to the MID server 126A and/or 126B via a data push via the REST API 308).

Once metric data (e.g., time-series data) is received by the MID server 126A or 126B, normalizer logic 312 may bind the metric data/time-series data to a relevant CI. In the current embodiment, the normalized metrics are provided to a queue 314 for subsequent analysis/processing. For example, a stream 313 of time-series/metric data is provided from the queue 314 to a local data store 316, which stores a copy of the queued time-series data.

Further, for anomaly detection, it may be useful to obtain a certain amount of historical data. The batcher logic 318 may provide the stream 313 of time-series/metric data to a REST API 320 of the Instance 130 in batches. The REST API 320 may provide the time-series/metric data to a journal and time-series database 322 (e.g., a round-robin database (RRD), such as JROBIN and/or MetricBase and/or other time-series database).

The time-series database 322 may be a time-series database that stores time-series data. As mentioned above, the time-series data may include properties regarding the CIs 110, such as network bandwidth, temperature, CPU load, and so forth, acquired at periodic or arbitrary intervals. The time-series database 322 may be circular buffer based databases that collect data at different times. The time-series data may be stored in a round-robin archive, in multiple round-robin archives, or the like. Generally, the time-series database 322 may continuously collect data (e.g., time-series data) along with date/time stamps recording the date and time in which each data item was received. After the time-series data has been collected, the time-series database 322 may be queried to retrieve a subset of the time-series data related to the query.

The time-series data may be a series type that is characterized as a "FLOAT_SIGNAL," which may be a series of {instant, value} with a discrete fixed time period, continuous dense values (e.g., each value is stored, missing intermediate values are interpolated), and numeric values stored as floats (e.g., 32 bit float representation). As such, the time-series data may measure performance properties (e.g., transaction count, transaction time, duration, counts) of components such as the CPU, memory, or the like. In addition, the time-series data may include data related to non-numeric values (e.g., string, bit fields, choices), numeric types other than floats (e.g., double, integer, decimal), non-periodic or sparse data (e.g., events), sub-second resolutions, multi-dimensional types (e.g., coordinates), and the like.

In some embodiments, instructions may be implemented to collect data (e.g., metrics) having a particular name, types, retention schedule 324 (e.g., 7 days at 1 minute intervals, 4 Weeks at 15 minute intervals, 3 Months at 1 hour intervals), and the like. As such, a dimension that details a name, type, and retention schedule for monitored properties, a time range including a start and end date, and the like may be provided, resulting in provision of the time-series data in accordance with the instructions (e.g., from the appropriate database(s), sensors, or the like).

In addition to the components described above, Reference Set Calculator 326 may be a processor-based component that receives the resultant time-series data from the time-series database 322 and aggregates the data for subsequent use as reference data for the anomaly detection module 328.

The anomaly detection module 328 includes a time-series analyzer 330 and an anomaly detector 332. In the illustrated embodiment, the time-series analyzer 330 and the anomaly detector 332 are logic (e.g., machine-readable instructions) executed on the MID server 126A or 126B. In alternative embodiments, the time-series analyzer 330 and/or the anomaly detector 332 may be executed on alternative servers/computers.

As mentioned above, for anomaly detection, it may be useful to obtain a certain amount of historical data. The anomaly detector 332 of each MID server 126A and 126B may include a cache 340 that is used to cache metric data that it receives. Accordingly, to ensure that the proper metric data is sent to proper cache 340, as mentioned above, the metric data may be distributed, from the distributed cache 127, to the proper MID server 126A and/or 126B. This may help to ensure that the anomaly detector 332 receives all relevant metric data for CI 110 metric data that it is tasked with processing.

Classifying the Time-Series Data

In some embodiments, such as when analyzing for seasonality, the reference data may include at least two weeks of historical time series data. Additionally and/or alternatively, in some embodiments, when providing alternative analysis, the reference data may include less data. For example, the reference data may include at least 30 data points, which may correlate to 7.5 hours of fifteen-minute averages. The amount of accumulated reference data may change based upon implementation details. For example, an amount of reference data may vary based upon a type of time-series database 322 that is used (e.g., JROBIN vs. MetricBase and/or other time-series database).

Using the reference data from the reference set calculator 326, the time-series analyzer 330 may at periodic intervals, determine a classification from a pre-determined set of classes, for incoming time-series data (e.g. the stream 313 of time-series/metric data). To do this, classifier logic 334 of the time-series analyzer 330 may analyze the reference data received from the reference set calculator 326 to determine one or more patterns, trends, or other characteristics of the data, which indicate a particular classification from the set of classes. The particular classifications and data characteristics that may be used to determine a particular classification will be discussed in more detail with regard to FIGS. 4-12. While the current discussion provides a limited set of classes, the classifier logic 334 architecture is extensible by design, allowing other types of distributions to be classified and/or handled. Accordingly, the current discussion is not intended to limit the classification types to those particularly discussed below, as a number of additional distributions and/or classification types may be possible.

Figure 4:
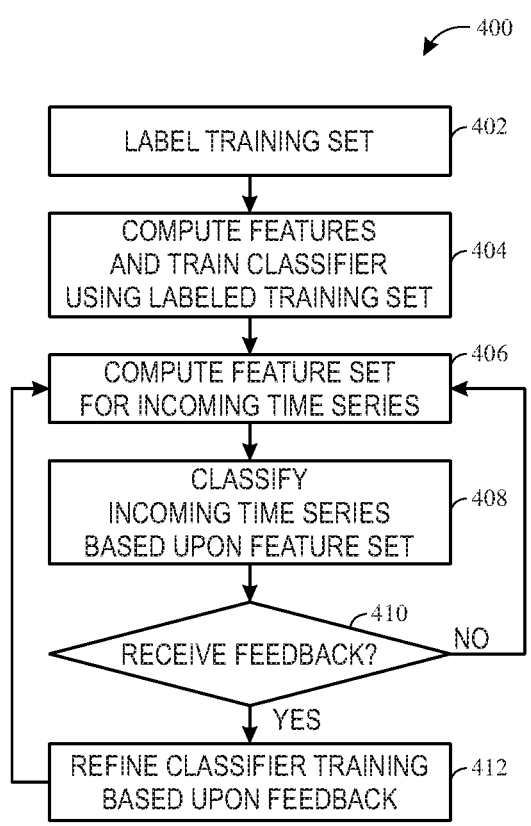
FIG. 4 is a flow chart of a process for supervised machine learning useful for classifying time-series data, in accordance with an embodiment.

Turning now to a discussion of the classification by the classifier logic 334 of the time-series analyzer 330, FIG. 4 is a flow chart of a process 400 for supervised machine learning useful for classifying time-series data, in accordance with an embodiment. The classifier logic 334 may include a decision tree, a naïve Bayes classifier, a neural network, a support-vector machine, etc. As illustrated in the discussion of process 400 below, the classifier logic 334 may be trained via a training set in order to classify new time series.

In some embodiments, implementation of the classifier logic 334 via a decision tree may short-circuit certain feature calculations. For example semi-constant data may be identified early and, thus, when the time series is near-constant, the classifier logic 334 may avoid computing various expensive features of the time series, such as a power spectrum, the seasonal/trend (e.g., Seasonal-Trend-LOESS (STL)) decomposition, etc. However, in alternative embodiments, when higher accuracy in classification is desired, alternative classifier approaches may be used.

Process 400 begins by labeling a training set consisting of a large number of time series, such as the ones described below with regard to FIGS. 5-12 (block 402). By labeling the training set with particular classifications, the classifier logic 334 may attempt to predict labels for subsequent time series, based upon a set of features between the training set and the subsequent time series.

For example, once the training set is labelled, features of the training set may be computed and the classifier logic 334 may be trained using the labelled training set and associated features (block 404). These features may include: basic statistics (minimum, maximum, range, mean, median, standard deviation, various robust statistics that ignore outliers, such as the inter-quartile range, etc.), various ratios and other functions of these statistics, the number of data points, the number of distinct values, several measures of the frequency spectrum (fraction of power in low, medium and high frequency ranges, the location of the frequency peak, etc.), other statistics (e.g. the median of the exponentially-weighted moving variability, measures of whether the time series has a statistically significant seasonality and/or trend, etc.), etc.

Figure 7:
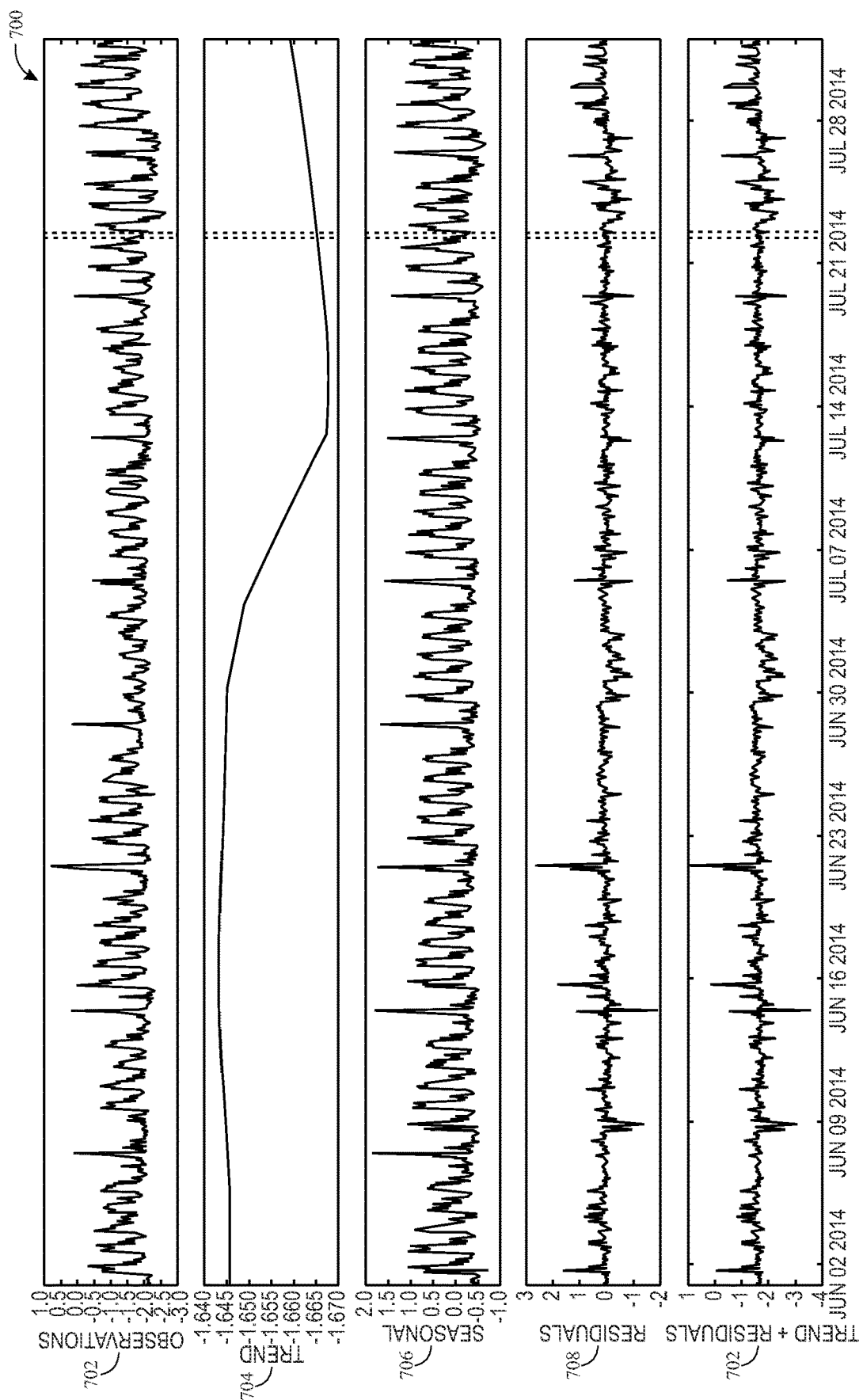
FIG. 7 is an illustration of a decomposition of the log of the time-series data of FIG. 6, using a Seasonal-Trend-LOESS (STL) algorithm, in accordance with an embodiment.

Additionally, in some embodiments, the process 400 may also look at whether transforms of the raw data appear to be closer to "normal" (Gaussian) via processes such as the Box-Cox transformation. In some embodiments, this may lead to using the logarithm or some power instead of the raw data, as illustrated in FIG. 7.

A supervised machine-learning classifier operates as a (generally nonlinear) function of the feature set. The training process produces a trained classifier that operates as a function from the feature set to the classification set. For example, if the feature set is represented as an array of values, X, the supervised learning may result in some function f(X) from the training data, with the goal of reproducing the hand-classification of the training data, while also generalizing to data outside of the training data set. Accordingly, during training, function f(X) is fit, such that it does not over-fit the training data. In other words, some elements of the training set may be classified incorrectly, in order to generalize to data outside of the training set. Overfitting may be avoided using various strategies, such as cross-validation, where training only occurs with respect to a part of the labeled training set, holding out some of the labeled samples for testing, and testing the trained classifier using the held back samples of the data-set that was not used in the training.

Once the classifier logic 334 is trained, features sets (X*) for the incoming time series are computed (block 406). The classifier logic 334 may classify the incoming series data based upon the feature set (X*) of the incoming time series data (block 408). For example, as mentioned above, during training, a choice of function f(X) is determined. To classify the incoming time series, the computed feature sets (X*) for the incoming data may be passed to the function, as the function has been generalized for data outside of the training set. Accordingly, the classification of the time series may be represented as f(X*).

In some embodiments, feedback regarding the classification by the classifier logic 334 may be received. For example, a user interface may be provided for customer feedback regarding whether the classifier logic 334 accurately classified the incoming time series. Further, in some embodiments, the customer feedback may include a correct classification for a misclassified time series. As depicted by decision block 410, when feedback is received, the feedback may be used to refine the training of the classifier logic 334 (block 412). However, when no such feedback is provided, classification of additional incoming time series may be classified by the classifier logic 334, which may be periodically re-trained using additional labelled training sets.

Figure 5:
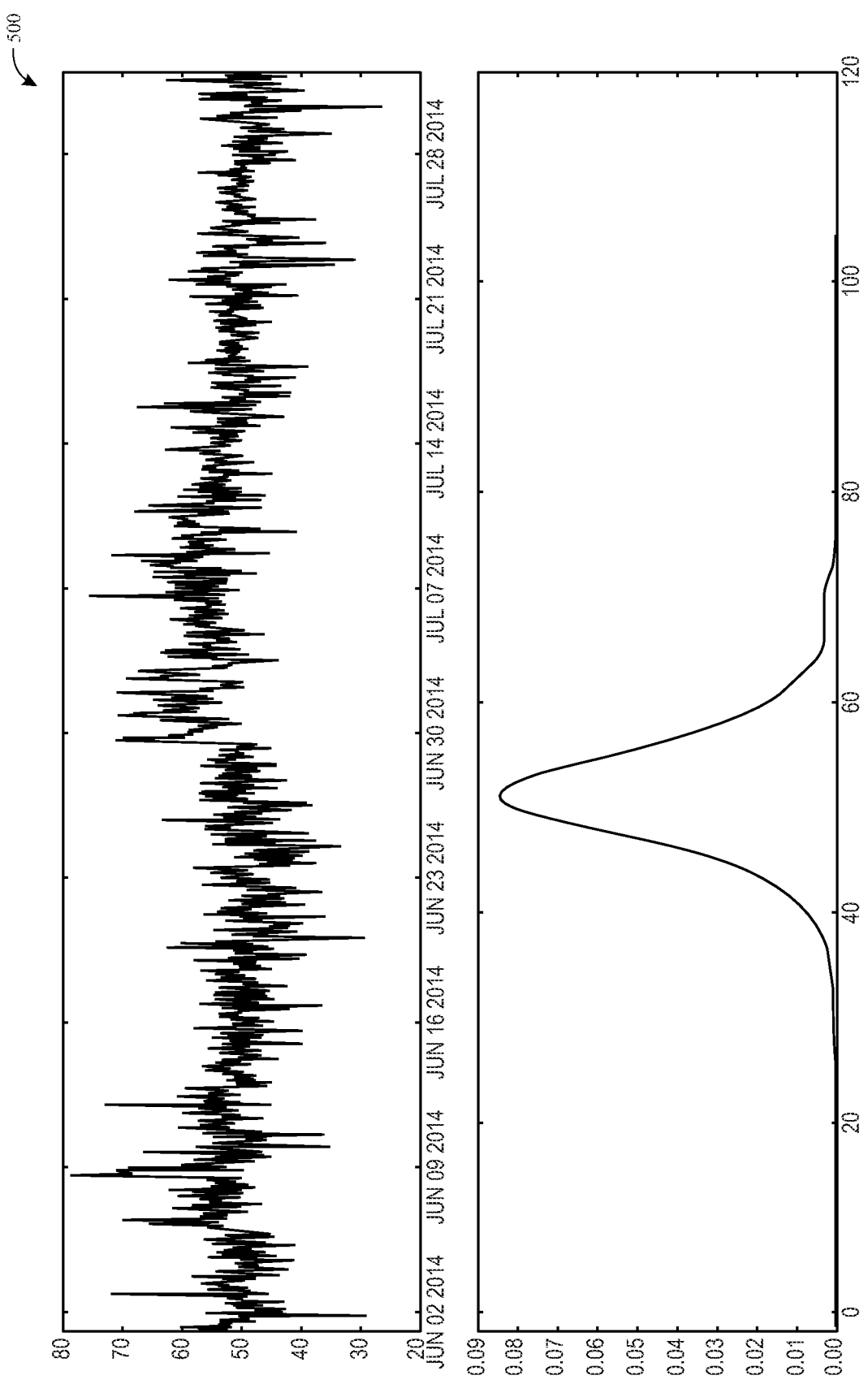
FIG. 5 is an example of time-series data classified with a quasi-normal classification, in accordance with an embodiment.

Turning now to a discussion of the labelled time series, FIG. 5 is an example of time-series data that appears to adhere to a stationary process and is, thus, classified with a quasi-normal classification, in accordance with an embodiment. A stationary process is a stochastic process whose joint probability distribution does not change when shifted in time. Consequently, parameters such as mean and variance, if they are present, also do not change over time. FIG. 5 is a plot 500 of the percentage of free memory for a server that does not have a strongly seasonal (hourly, daily or weekly periodic) component, along with a plot of the estimated probability density for this signal. The data of FIG. 5 have a mean of 51.7 and a standard deviation of 5.7. For this kind of signal, outliers are easily identified using variance based metrics or derivations, such as by characterizing measurements outside of $\mu \pm 3\sigma$; (e.g., outside of the range 34.5-68.9%) as outliers, where $\mu$ is the mean and $\sigma$ is the standard deviation of the data. In order to keep anomalies from having a large effect on the future control bounds, a robust estimation of the standard deviation may be used instead of the sample standard deviation itself. This may be based on the median-absolute-deviation, some inter-percentile range adjusted to give the correct standard deviation, or some other statistically robust estimation of the width of the distribution. IT metric data will typically not be strictly normal, but Chebyshev's inequality theorem states that 89% of the metric observations will lie in this range, and for symmetric distributions with a single mode (peak) it can be shown that about 95% of the metric observations will lie within these bounds.

Figure 6:
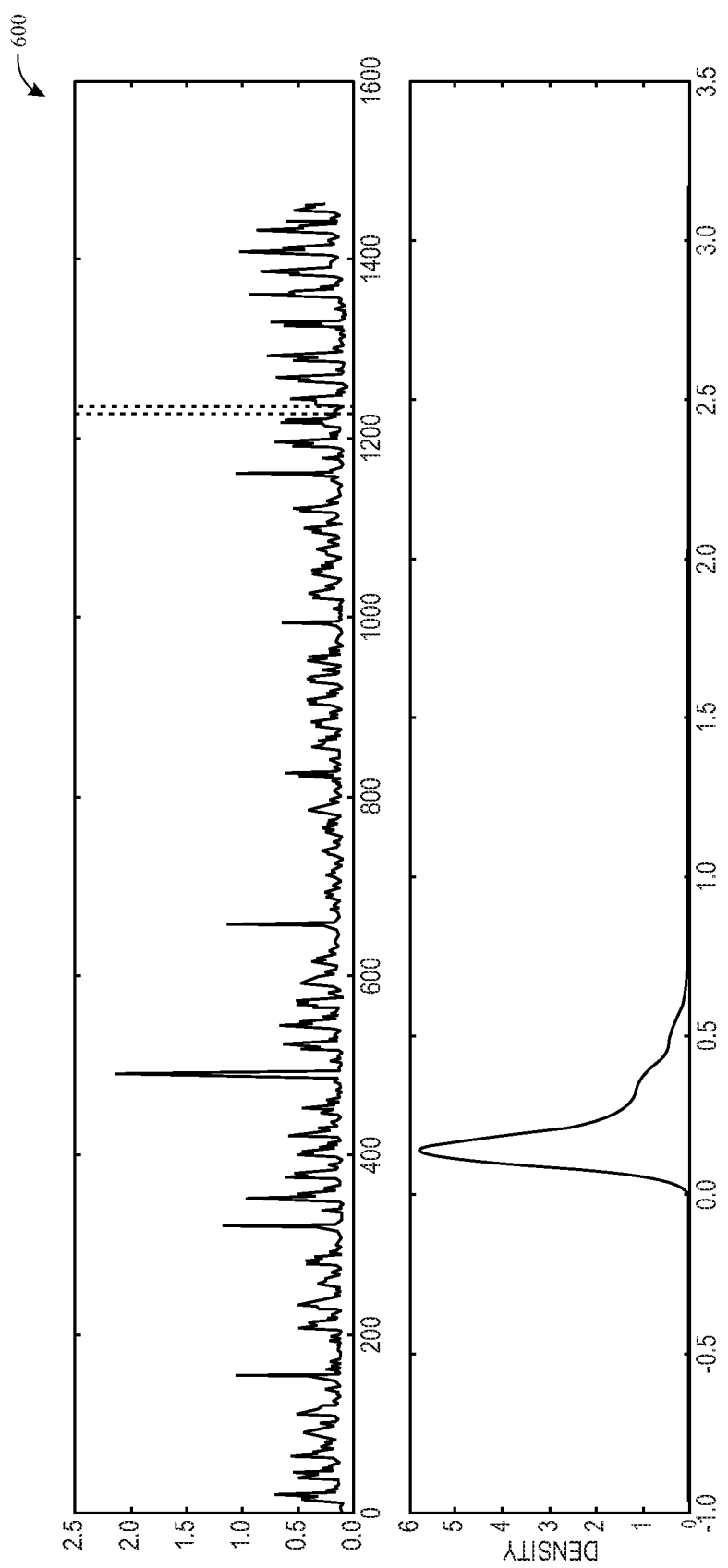
FIG. 6 is an example of time-series data classified with a seasonal classification, in accordance with an embodiment.

If the data appears to adhere to a periodic non-normal distribution, the historical data may be classified as seasonal. IT data will often show periodic effects due to changes in load or usage pattern throughout the day, week, or year, along with general trends over time. For example, FIG. 6 is a plot 600 providing an example of the 15-minute average number of servlet database connections for a particular server in the data center. This data exhibits seasonality that results in a highly non-normal distribution. Accordingly, the time-series data is classified with a seasonal classification, in accordance with an embodiment.

This seasonal-classified data may be modeled by extracting the seasonality along with any trend from the time-series data. The seasonality and trend curves are smoothed and the seasonality is fit with a spline (e.g., that has on the order of one knot per hour). The trend may be extrapolated either as a constant or as a linear trend, depending on the data. If there is no seasonality, then only trend is extracted. The statistics for the residual after seasonality and trend extraction is computed and stored. In some instances these statistics are computed using raw time-series data instead of averaged time-series data and/or via robust estimates, as mentioned above. If the raw time-series data cannot be stored for a full week (or other desirable periodic basis), then, in some embodiments, the model may be updated nightly (or other fallback periodic basis).

FIG. 7 is an illustration of a decomposition 700 of the logarithm of the time-series data 600 of FIG. 6, using a Seasonal-Trend-LOESS (STL) algorithm, in accordance with an embodiment. Plot 702 illustrates the source time-series data observations. The trend plot 704 reflects the long-term progression of the time-series data (e.g., an increasing and/or decreasing direction in the time-series data). Seasonal plot 706 represents the seasonal variation patterns (e.g., patterns at particular fixed and/or known time periods). Residuals plot 708 represents the residuals or remainder of the time-series data after the trend and seasonality is removed. Plot 710 illustrates the trend data added to the residual data. A projection of the expected behavior for this time-series is obtained by smoothing the trend and seasonality components of the STL decomposition. Upper and lower control bands can then be computed by offsetting by the standard deviation of the residual from the STL decomposition 700. In some embodiments, the upper and lower control bounds may be computed using a robust estimate, as discussed above. Additionally and/or alternatively, other approaches may be used to extract and project the seasonal and trend components forward, including various state-space models such as Holt-Winters, a seasonal Kaman filter, or various Bayesian models for the seasonal components of the signal, etc.

If the data appears to be noisy data that has a significant trend, the historical data may be classified as trendy data. Such data may occur frequently. For example, such data may arise as data center capacities (e.g., free disk space, CPU utilization, free memory, etc.) is reached. In such situations, slow trends may occur as the load-per-server increases. This may be an expected increase that will factor into capacity planning.

Data classified as trendy may be handled similarly to data classified as seasonal, except that only the trend is extracted. The trend may be extracted using a linear regression, but may also be done with a more robust technique, such as a Theil-Sen estimator. The standard deviation of the residual distribution is calculated, possibly using a robust estimate, and then used to compute control bounds as offsets from the projected trend. For anomaly detection purposes, this trend may be extracted, such that desirable statistics may be computed for the residual signal, thus allowing control bounds to be drawn that parallel the trend.

Figure 8:
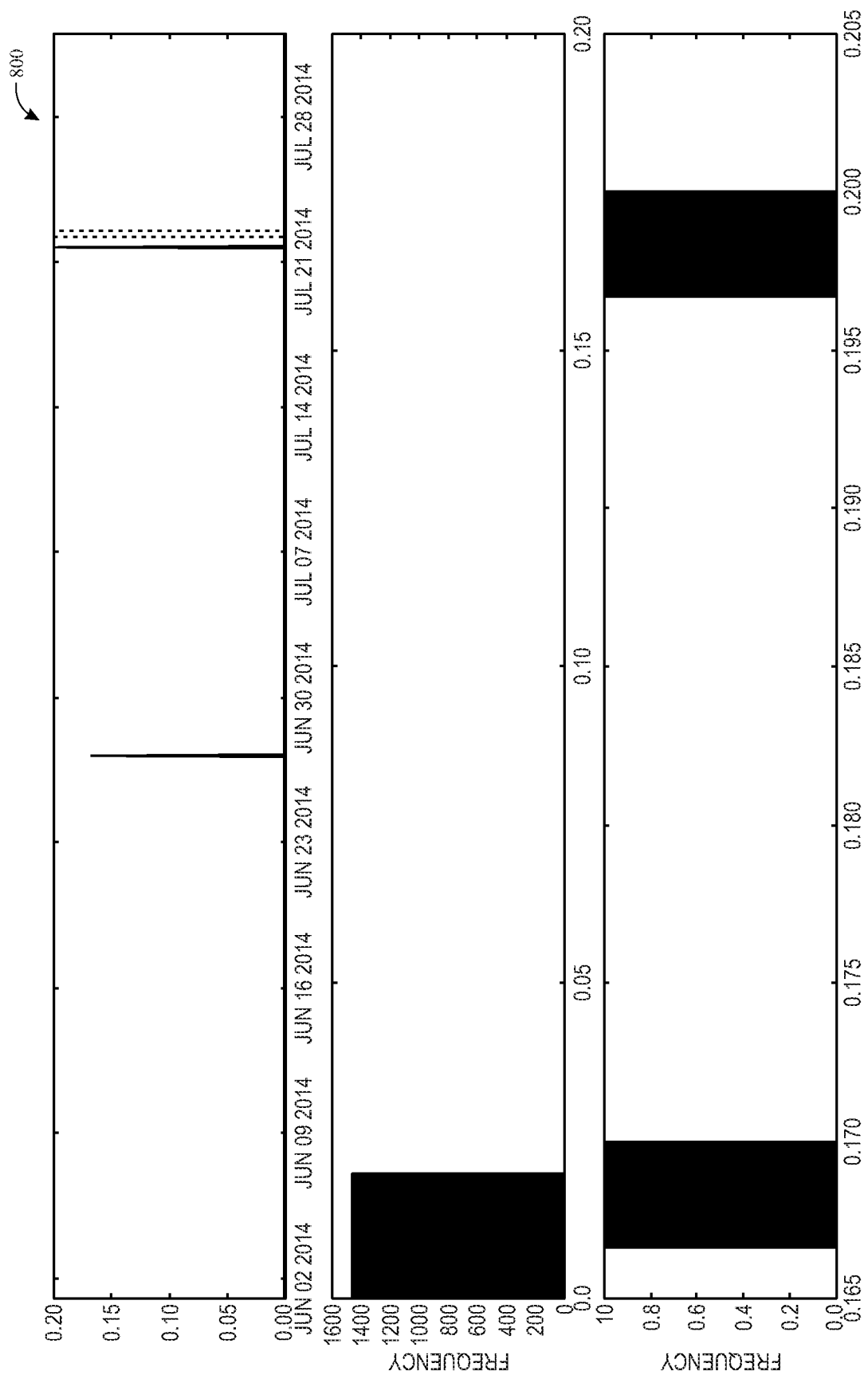
FIG. 8 is an example of time-series data classified with a near-constant classification, in accordance with an embodiment.

If the data appears to adhere to a near-constant value, the historical data is classified as near-constant. FIG. 8 is an example of a plot 800 of a time-series for the normalized scheduler queue length for a server in a data center. This data is almost always 0 but on two occasions jumped up to 0.167 and 0.2 (only visible on the frequency plot by filtering out the 0 values). Accordingly, the time-series data is classified with a near-constant classification, in accordance with an embodiment.

Figure 9:
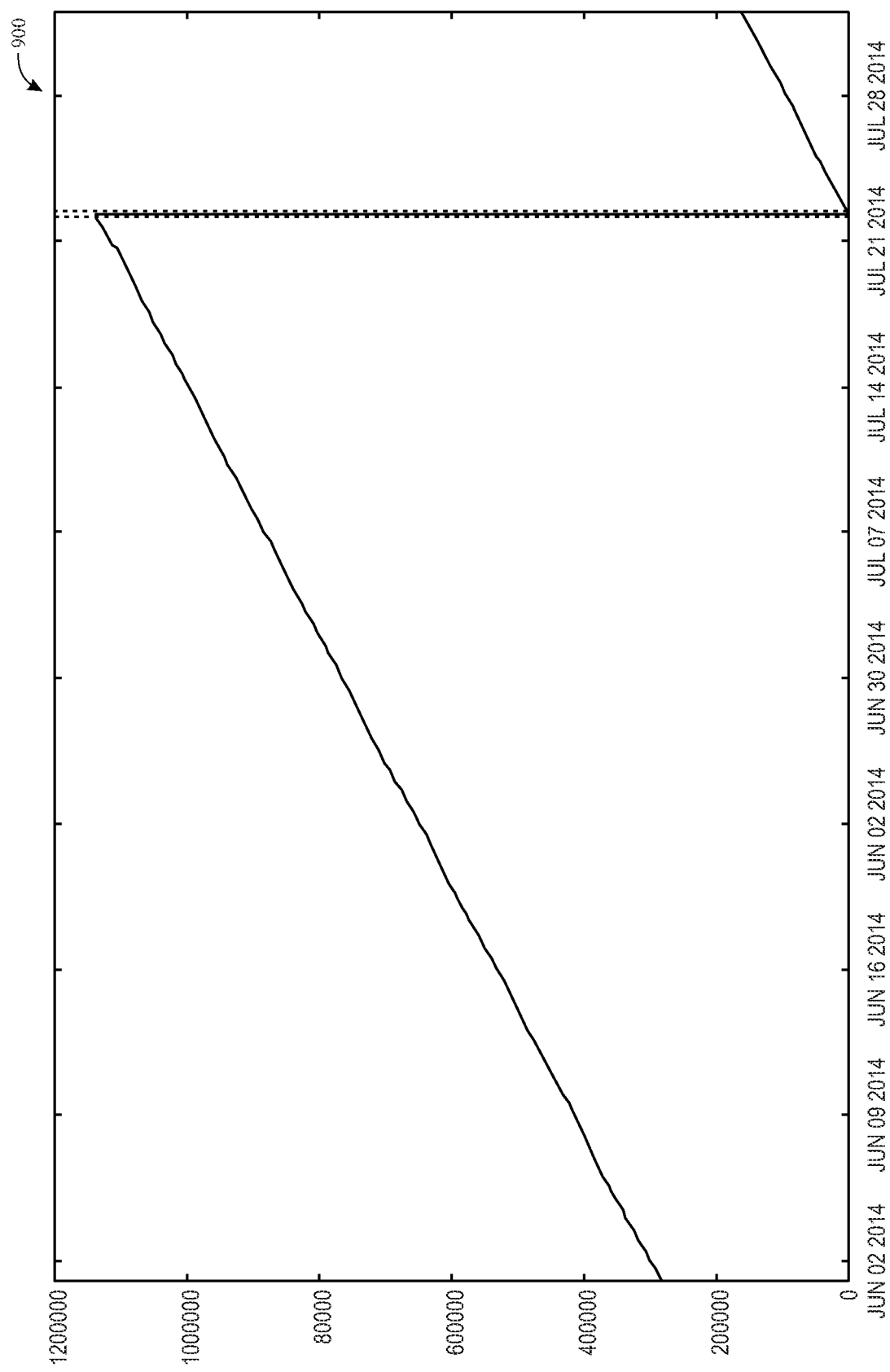
FIG. 9 is an example of time-series data classified with an accumulator classification, in accordance with an embodiment.

If the data appears to be the accumulation (sum) of a low-noise signal, the historical data may be classified as accumulating data. FIG. 9 is an example of time-series data 900 showing the total number of jobs on a particular server. This value is expected to increase at a steady rate and can be well fit with linear regression. This series exhibits an outlier due to the server being restarted after a software upgrade. Accordingly, based upon this trend, the time-series data is classified with an accumulator classification, in accordance with an embodiment.

The "Accumulator" classification may also be fit with a linear approximation, but the residual may typically not be random. Thus, control bounds may not be an appropriate outlier detection mechanism. These time series may be transformed by differencing (e.g., monitoring the difference between successive observations instead of monitoring the metric time series itself). Accumulator-classified data may often be a near-constant series that in turn is monitored for change detection, rather than for data points that fall outside of the control limits.

Figure 10:
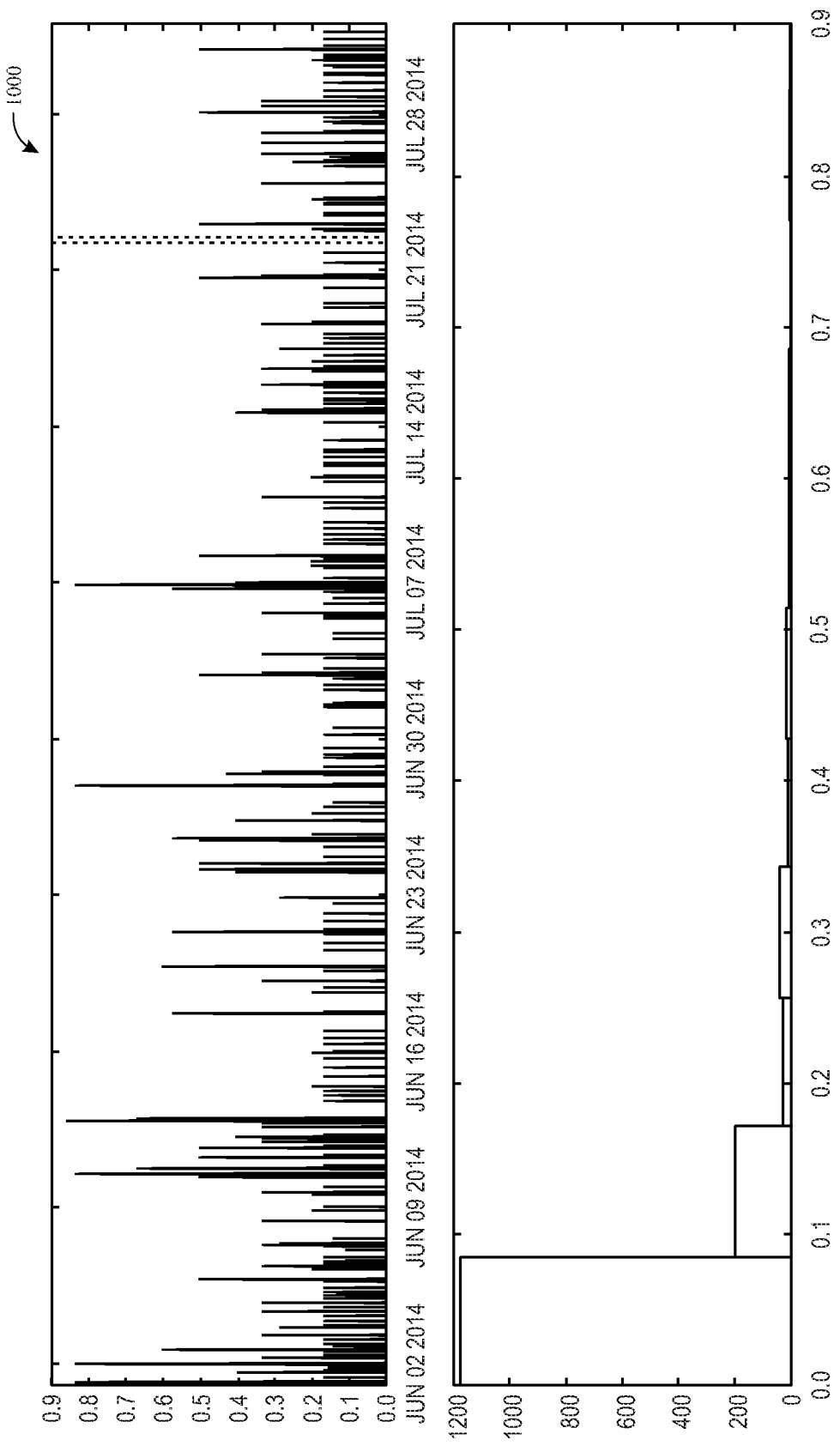
FIG. 10 is an example of time-series data classified with a multinomial or categorical classification, in accordance with an embodiment.

If the data appears to adhere to a set of discrete values, the historical data may be classified as multinomial or categorical. For example, FIG. 10 is an example of time-series data 1000 that shows the average number of semaphores in use on a particular server along with its frequency distribution. Because this time-series data includes a set of discrete values, the time-series data is classified with a multinomial or categorical classification, in accordance with an embodiment.

Figure 11:
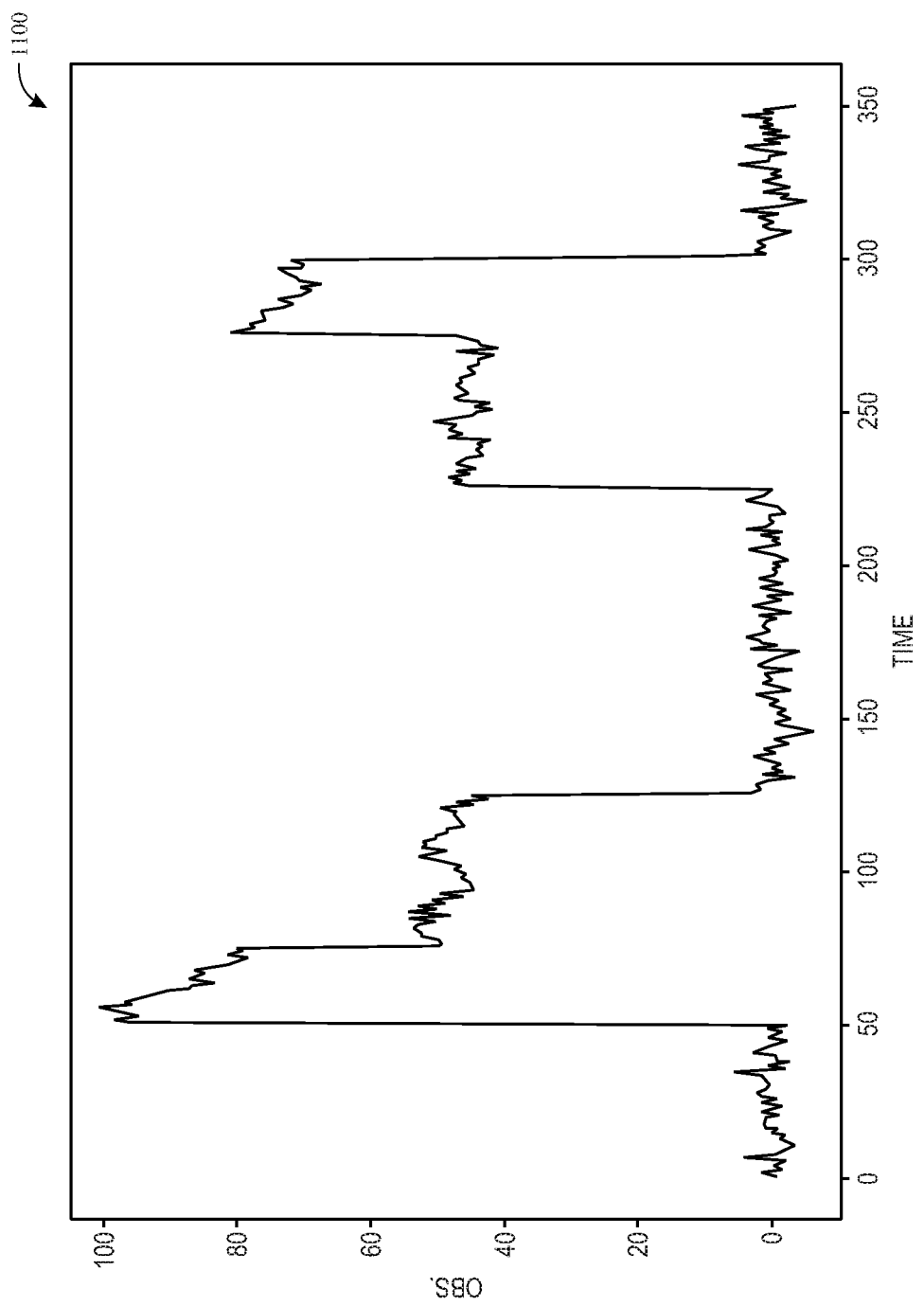
FIG. 11 is an example of time-series data classified with a switching classification, in accordance with an embodiment.

Time-series data can sometimes have a "stickiness" in which it tends to jump from state-to-state. If the data appears to adhere to state-to-state jumps, the historical data may be classified as switching. FIG. 11 is an example of a switching signal 1100 that is with a switching classification, in accordance with an embodiment. An example of such a time-series data set might include a server that is sometimes idle and sometimes running a particular job, having different characteristics in the two modes.

If the data appears to adhere to be event-timing-dependent, the historical data may classified as arrival. Customer logins, clicks on a particular link, etc. are examples in the IT monitoring environment that may exhibit these characteristics.

Figure 12:
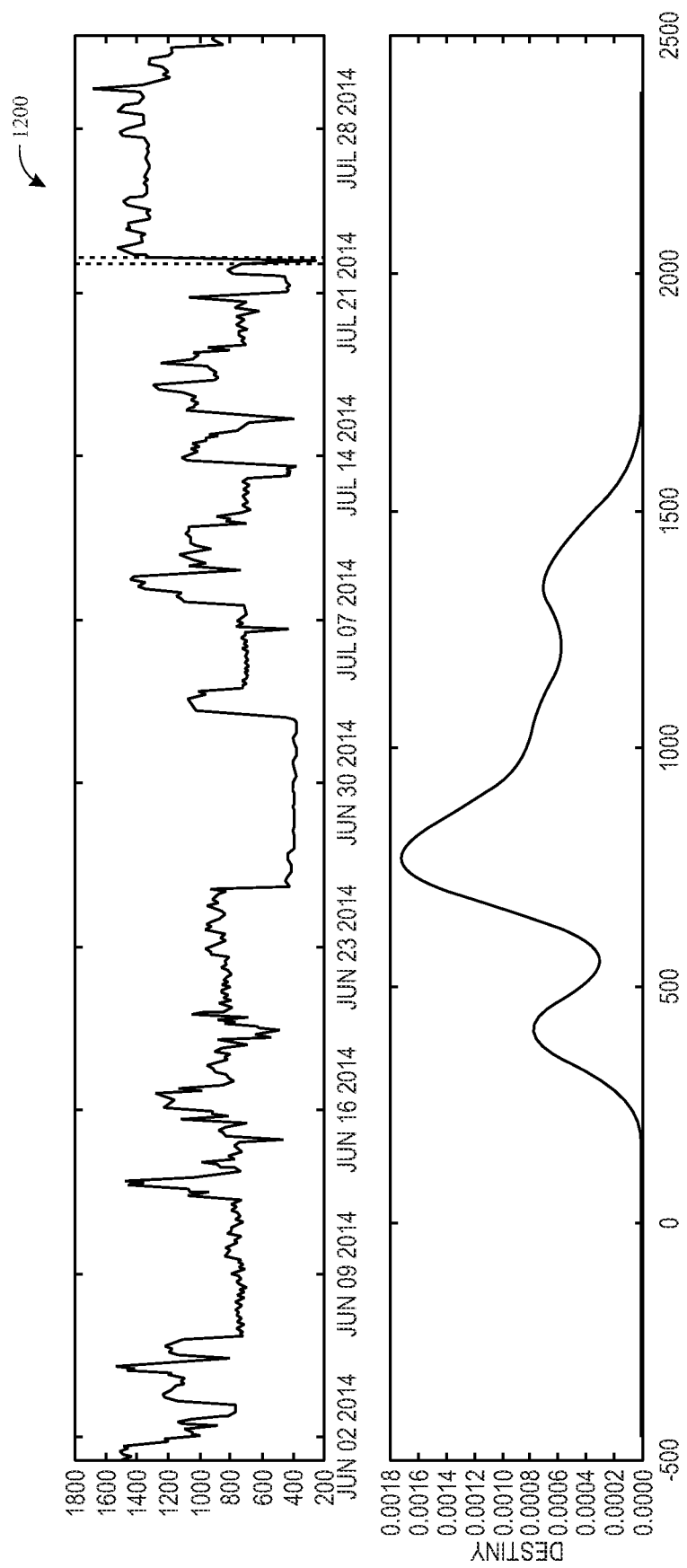
FIG. 12 is an example of time-series data that is not classified according to the example of FIGS. 5-11.

If the historical data does not conform to any of these characteristics, the historical data may be classified as other data. FIG. 12 is an example of time-series data 1200 that is not classified according to the example of FIGS. 5-11, in accordance with an embodiment. The time-series data 1200 shows a number of active sessions on a server in a data center, along with its distribution. There are some hints of sticky multinomial behavior. However, the pattern is not strong enough to envision a simple model for characterizing the time-series data 1200.

Constructing the Statistical Model

Returning to FIG. 3, after classification is complete, model builder logic 336 of the time-series analyzer 330 may construct an underlying statistical model representative of the stream 313 of time-series data based at least upon the determined classification. For example, the stream 313 may be characterized according to one or more features based upon a particular classification. The underlying statistical model 337 may be stored in the model cache 338 and a time-series models data store 335 of the Instance 130.

Figure 13:
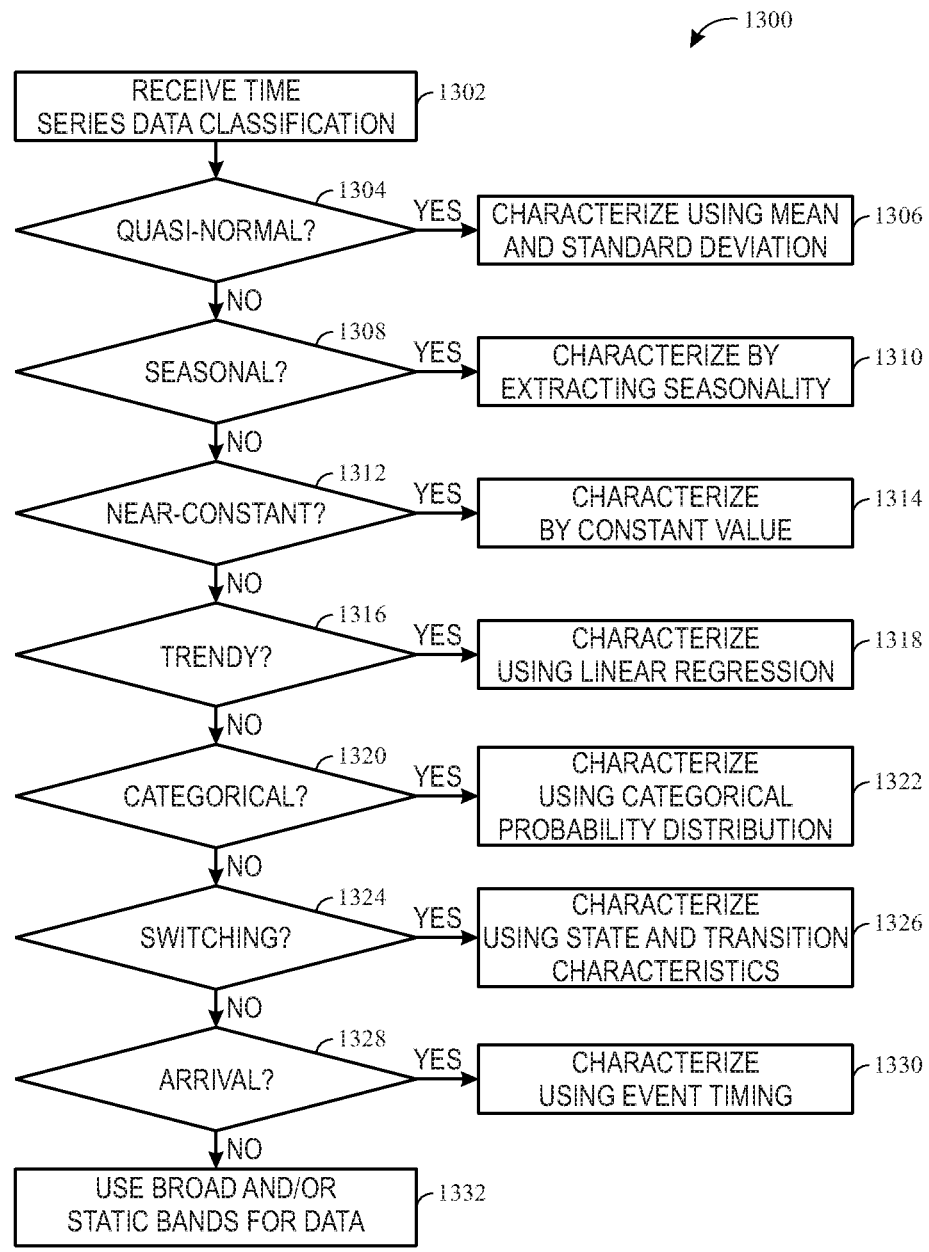
FIG. 13 is a flow chart of a process for characterizing classified time-series data, in accordance with an embodiment.

FIG. 13 is a flow chart of a process 1300 for characterizing classified time-series data, in accordance with an embodiment. This characterization may be used to generate the underlying statistical model 337 of FIG. 3. The process 1300 begins by receiving the time-series data classification derived from block 408 of the process 400 of FIG. 4 (block 1302). If the classification is quasi-normal (decision block 1304), the time-series data may be characterized using a mean and standard deviation of the time-series data (block 1306).

i. Seasonal Data

Figure 14:
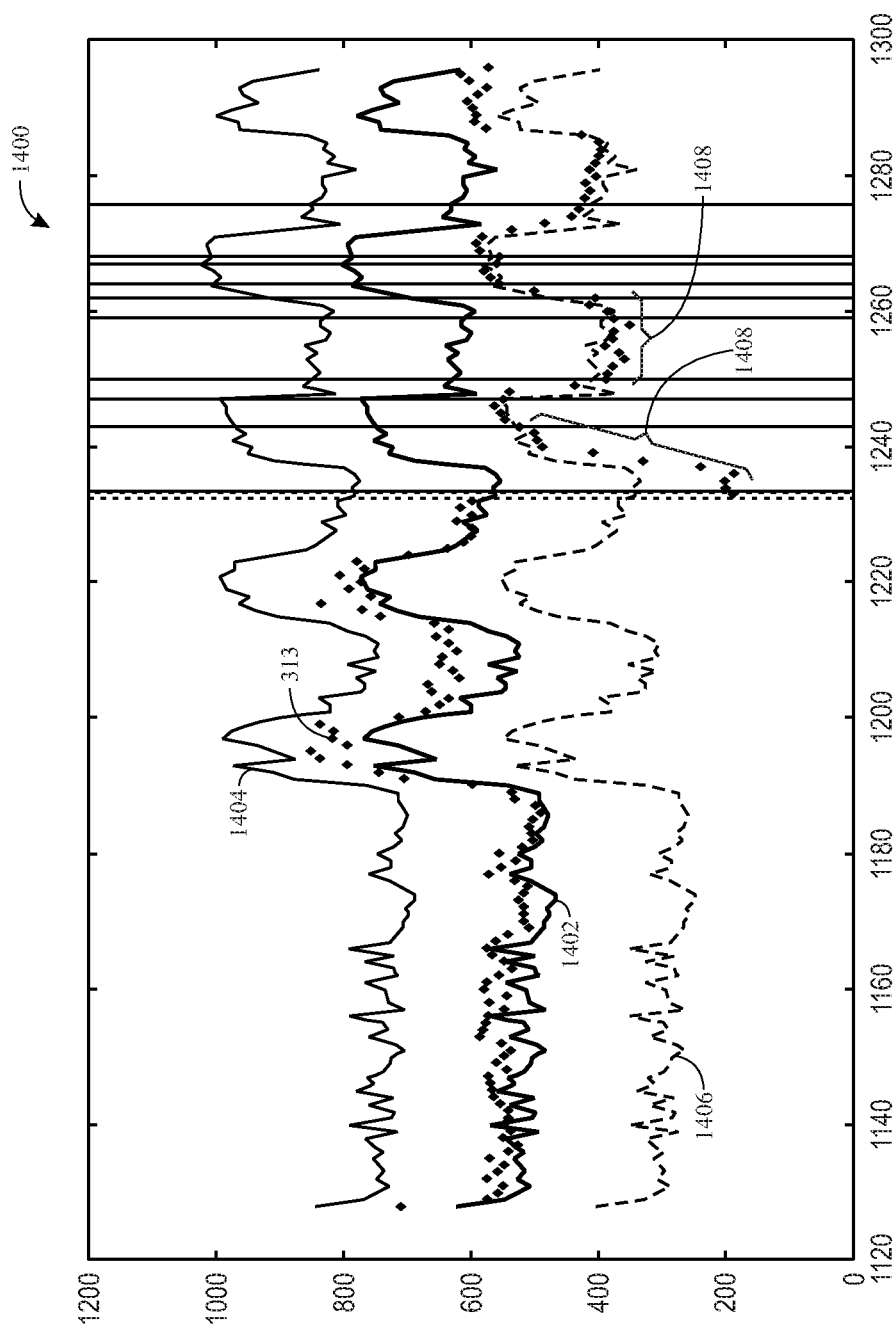
FIG. 14 is a scatter plot diagram illustrating outlier analysis and identification of anomalies, in accordance with an embodiment.

If the classification is seasonal (decision block 1308), it may be beneficial to extract the seasonality from the time-series data. Extracting seasonality enables projection of dynamic control bounds which may provide an accurate statistical forecast of where future data is expected to lie. Thus, the extraction of seasonality enables more accurate identification of points that are far from where they are expected to lie. Ignoring these seasonal trends may lead to false positives, when a strong daily or weekly spike might register as an anomaly if statistics had been computed without adjusting for seasonality. Similarly, false negatives may be possible, as a data point may be outside the dynamic (seasonally-adjusted) upper control bound in the trough of a seasonal pattern but be inside a static control bound computed without first extracting the seasonal component. For example, the higher points of outliers 1408 of FIG. 14 illustrate points that are outside the control bound at that time but would be inside the time-average of that control bound. Accordingly, the time-series data may be characterized by extracting seasonality (e.g., in accordance with FIG. 7) (block 1310).

Multiple seasonality models may be used. For example, in some embodiments, a weekly seasonality model which models seasonality over business days may be used (e.g., when seasonality is affected by weekend vs. weekday days). However, in some embodiments, a 24 hour seasonality model may be used (e.g., when seasonality is not affected by weekend days vs. weekday days). The system may determine a selection of a particular model to use. To do this, a validation step may be applied to the fitting workflow where the sequence of modes are compared to each other and the log-likelihood for the fit of each of these models is us used to determine the proper model selection.

The time-series data may be fit to both the weekly seasonality model and the 24 hour seasonality model. The log-likelihood for the fit of each of these models is compared with fit thresholds to determine if the fit thresholds are achieved by the fit. The applicable model is selected from the set of models based upon the fit thresholds being achieved.

The fit thresholds provide a representation of a difference in dimensionality between the two fits of the two models. The fit thresholds may be determined according to a modified Wilks' Theorem. Wilks' Theorem suggests that the distribution of a log-likelihood difference will be $\chi^2$ with degrees of freedom equal to the difference in dimensionality of the two models. Unfortunately, however, Wilks' Theorem is not strictly applicable to the seasonality models extracted with STL smoothing because the models are not maximum-likelihood models and are not simply characterized by some constant number of fit parameters. Accordingly, manufactured or synthetic data may be used to empirically discover the fit thresholds. For example, a number of experiments may be performed with the synthetic data where the models are fit the synthetic data. The distribution of the log-likelihood difference between these fits may be observed and used to define the fit thresholds used to select a proper model.

To illustrate one manner of determining the fit thresholds, the discussion begins with an example of applying Wilks' Theorem to test for linear model significance. A linear regression may be compared to a normal fit for data drawn from a population that has no underlying trend. The sample will have a slight trend, just by chance, and so the linear model will be a better fit. Wilks' Theorem says that the log-likelihood difference of the two fits will be distributed as chi-squared with one degree of freedom. Since the normal fit is a linear fit with zero slope, it is a nested model in the sense of Wilks' Theorem. If the true slope is 0, then the log-likelihood statistic:

$$D = -2 \log \frac{L_{normal}}{L_{linear}} = 2 \log(L_{linear} - L_{normal})$$

would be distributed as $\chi_1^2$. Accordingly, we can reject this hypothesis if this difference is sufficiently large (e.g., the 99% cumulative distribution function point for $\chi_1^2$ is about 6.63, so if D>6.63 we can be 99% certain that the null hypothesis (that the slope is 0) is not true.

Having now discussed the Wilks' Test for linear model significance, the discussion turns to a test for computing the fit threshold in the log-likelihood difference between the daily (e.g., 24 hour model) and weekly (e.g., weekday) fits based on a test when there was not significant weekly effect. For this test, synthetic data was generated from a population that has a 24 hour seasonal pattern that is similar to those observed in practice. From there, the log-likelihood difference statistic:

$$D = -2 \log \frac{L_{daily}}{L_{weekly}} = 2 \log(L_{weekly} - L_{daily})$$

is calculated. Obeying Wilks' Theorem, D is distributed as $\chi_{n_d}^2$ where $n_d$ is the difference between the model complexity of the daily and weekly models.

As with the linear case above, the sample includes some variation from day-to-day and so the weekly model may typically be a better fit. Unlike the case above, however, these models are not strictly covered by Wilks' Theorem as the seasonal fit is not computed as an optimization problem, but rather is an iterative smoothing problem. As a result, it is possible for the weekly fit to actually be worse than the daily fit. In the cases tested, the difference appeared to be distributed with a chi-squared distribution with about 41 degrees of freedom. Accordingly, a reasonable cutoff for the log-likelihood difference, in some embodiments, may be approximately 100. However, as with the linear test above, the current cutoff may result in picking a weekly model in cases where the difference is not practically significant, even if it was statistically significant. Accordingly, additional buffer may be added to the cutoff (e.g., resulting in a higher cutoff, such as 200).

ii. Near-Constant Data

If the classification is near-constant (decision block 1312), the time-series data may nearly always present a constant value. Accordingly, the time-series data may be characterized by the constant value (block 1314).

If the classification is accumulating or trendy (decision block 1316), the time-series data may be characterized using a linear or non-linear regression (block 1318). The linear regression may be computed using ordinary least squares, or may be computed with a robust estimator, such as the Theil-Sen estimator, or other such robust estimator. In other words, the regression may be used to fit the underlying statistical model to the observed time-series data, resulting in a more accurate prediction based upon the trend.

iii. Categorical Data

If the classification is categorical (decision block 1320), a set of discrete values may be present in the time-series data. Accordingly, the time-series data may be characterized using a categorical probability distribution of the discrete values (block 1322). Thus, the time-series data may be evaluated for anomalies based upon a relative adherence and/or divergence from the categorical probability distribution.

iv. Switching Data

If the classification is switching (decision block 1324), a transition between multiple states may be exhibited in the time-series data. Accordingly, the time-series data may be characterized using state and transition characteristics of the time-series data (block 1306). This may result in more accurate evaluation of anomalies based upon the particular states and/or transitions.

v. Arrival Data

If the classification is arrival (decision block 1328), certain events may impact the time-series data. Accordingly, for anomaly detection purposes, the time-series data may be characterized using the event timing, as such timing may impact the time-series data values (block 1330).

vi. Other Data

Otherwise, if the time-series data does not fall into one of the above pre-determined classifications, it may be more difficult to characterize the time-series data. In such situations, it may be useful to use broad bands based on the standard deviation (or other variance-based measures) of the time-series data and/or static bands to characterize the time-series data (block 1332).

Based upon the characterization variables, the underlying statistical model 337, illustrated in FIG. 3, is generated. Once the underlying statistical model is generated, the underlying statistical model 337 may be used to project an expected trend T(t) and seasonality S(t) forward for a time period (e.g., a week) and may also be used to compute upper and lower control limits as $T(t)+S(t)\pm n\sigma$, where n is configurable but, in some embodiments, will default to 3, giving the 99% confidence interval if the residual is actually normal. The model query component 341 may return these limits at any time during the time period (e.g., the week).

Outlier Detection

Returning to FIG. 3, the anomaly detector 332 may monitor the stream 313 of time-series/metric data. As mentioned above, the metric stream may include metric data that is read out from the distributed cache 127 to a relevant MID server 126A and/or 126B that is assigned to process the metric data. Accordingly, in some embodiments, a subset of the data received at the distributed cache 127 may be distributed as the metrics stream 313 of MID server 126A and a subset of the data received at the distributed cache 127 may be distributed as the metrics stream 313 of MID server 126B.

The anomaly detector 332 identifies statistical outliers of a current stream 313 of the time-series/metric data, by performing a statistical analysis on the stream 313 of the time-series/metric data based at least in part upon the underlying statistical model 337 constructed by the time-series analyzer 330. FIG. 14 illustrates an example plot 1400 illustrating the relationship of the features of this comparison. Specifically, the anomaly detector 332 compares the actual observed data (e.g., stream 313) with the expected data 1402 (e.g., as determined based upon the underlying statistical model 337). Upper bounds 1404 and/or lower bounds 1406 may also be used to determine the outliers. For example, data may be determined to be an outlier if it falls outside the range of the upper bounds 1404 to the lower bounds 1406. For example, outliers 1408 are identified in the plot 1400, because they fall below the lower bounds 1406.

Anomaly Scoring

The outliers, however, do not necessarily constitute anomalies for the system 300. For example, an event with a probability of 0.01% per minute will occur about once a week in minute-level data. Accordingly, returning to FIG. 3, the anomaly detector 332 tracks the history of these outliers (e.g., in the cache 340) and based upon this history, determines an anomalous score 339 for the statistical outliers (e.g., via the algorithm 342). The anomalous score 339 may provide a representation of a magnitude of deviation between the current time-series data and the underlying statistical model over multiple measurements of the current time-series data, over a particular time interval, or both. For example, observing ten 0.01% events in an hour may result in a high anomalous score. The anomalous score 339 may be stored in an anomalies data store 344 at the Instance 130 and/or may be presented to a client communicatively coupled to the system, for subsequent reporting, client action, or both. Additionally, when the anomaly score is above a determined threshold, the anomaly detector 332 may raise events 346 by providing the events 346 to an alerts data store 348 (e.g., via an event API 350). As depicted, the events 346, anomaly scores 339, time-series model data 337, and/or data from the time-series database 322 may be presented, via an API 352 (e.g., a REST API), to a user-interface client 354 (e.g., for reporting and/or remedial action).

Figure 15:
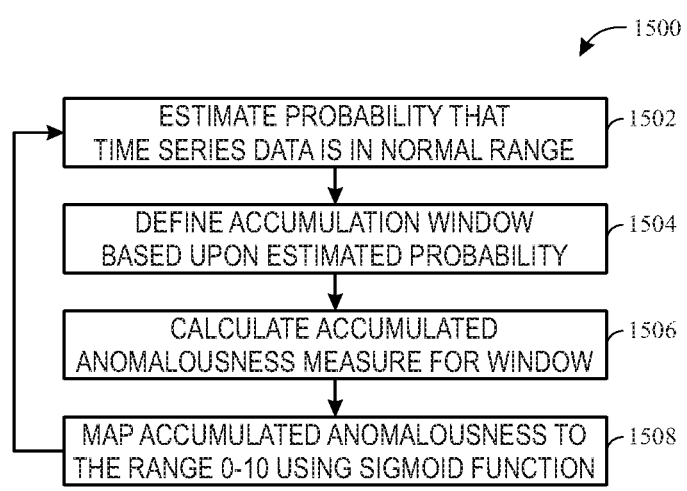
FIG. 15 is a flow chart of a process for calculating an anomaly score, in accordance with an embodiment.

FIG. 15 is a flow chart of a process 1500 for calculating an anomaly score, in accordance with an embodiment. The anomaly score may use a dynamically adjustable window of data to detect anomaly likelihood. Accordingly, an estimate of the probability that the current time-series data value is in a normal range is determined (block 1502).

The moving average of this probability may be tracked, for use in determining the dynamic range of the accumulation window (block 1504). Such a moving average may be a simple moving average, a simple weighted moving average, an exponentially weighted moving average, or other suitable metric of central tendency that may be probabilistically evaluated. When the probability that the time-series data values are in a normal range is low, the window may be extended, to help ensure than anomalies are captured, regardless of the magnitude of the anomaly. Conversely, when the probability that the time-series data values are in a normal range is high, the window may be shortened, enabling the anomalousness to decay back to zero relatively quickly.

An accumulated anomalousness measurement is also calculated (block 1506). The accumulated anomalousness measurement is an integral of area between the time-series data value and the control bounds inside the accumulation window defined in block 1504.

A sigmoid function may be applied to the accumulated anomalousness measurement and the resultant value may be scaled to provide a scaled anomalous score (block 1508). For example, in some embodiments, the resultant anomalous scores may range from a scale of 0-10.

Figure 16:
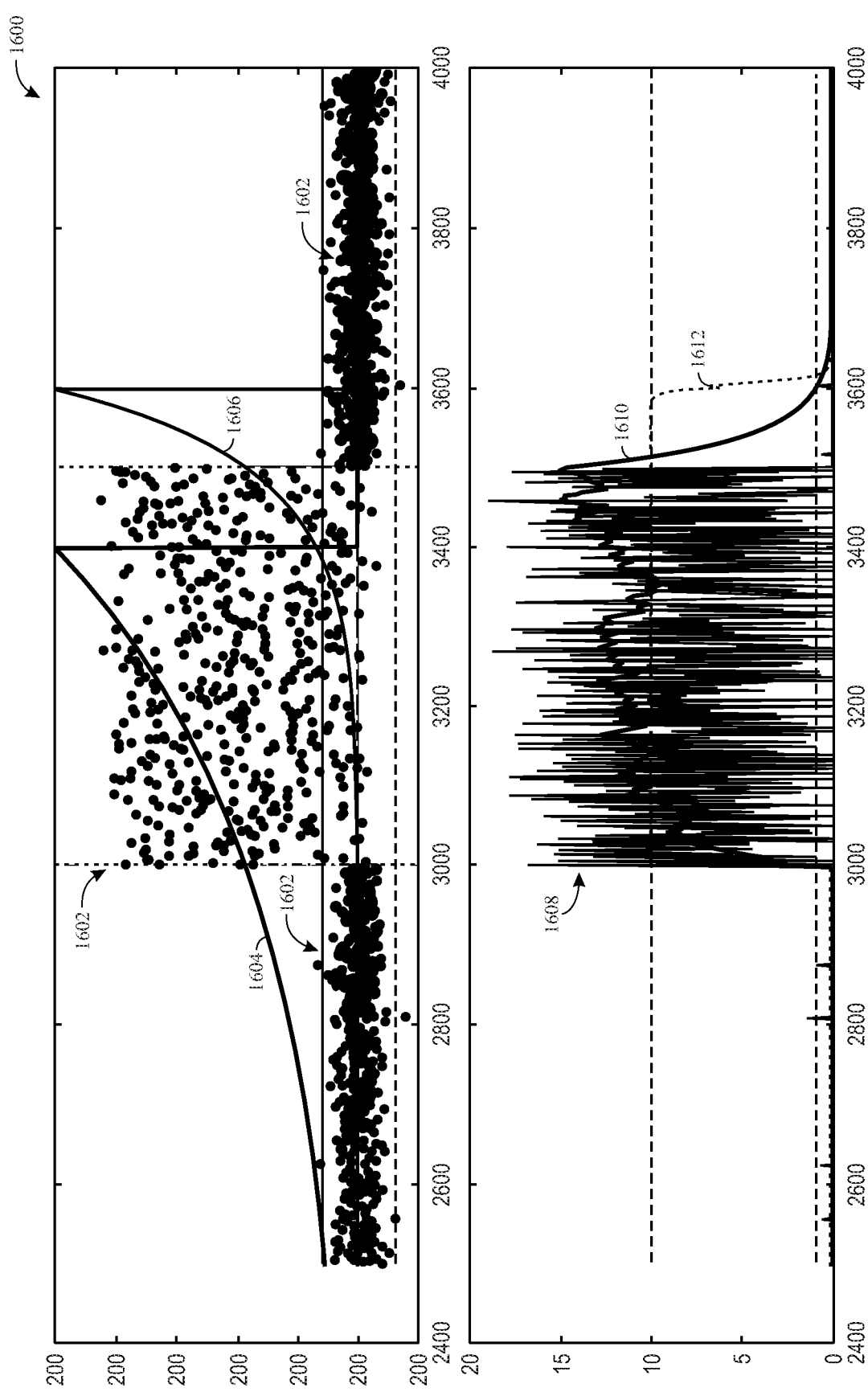
FIG. 16 is a diagram illustrating anomaly scores generated for example time-series data, in accordance with an embodiment

FIG. 16 is a diagram 1600 illustrating anomaly scores generated for example time-series data, in accordance with an embodiment. In the current example, line 1604 illustrates the anomalous window and line 1606 illustrates the normal window. At t=3000 the time-series data 1602 becomes anomalous. For every point above the upper control limit a Z-Score is computed based on the learned mean and standard deviation of the time-series data 1602. The outlier signal 1608 derived from this score is $-Z_c+\Delta Z$ where $Z_c$ is the control factor for the model (e.g., 3) and $\Delta Z$ is an incremental amount that is added so that marginally anomalous metrics become critical in a finite time. This outlier signal 1608 is accumulated, with a finite memory, into an accumulated anomalousness measurement 1610. This accumulated anomalousness measurement 1610 is then fed to the sigmoid function and rescaled to give a resultant score 1612 in the range of 0-10.

Change Detection Classification

In some embodiments, it may be desirable to classify whether an anomaly results in a level change. For example, anomalies may occur due to transient noise and/or level shifts. It may be useful to distinguish between these two types of anomalies, as level shifts may be a sign of more serious issues.

Figure 17:
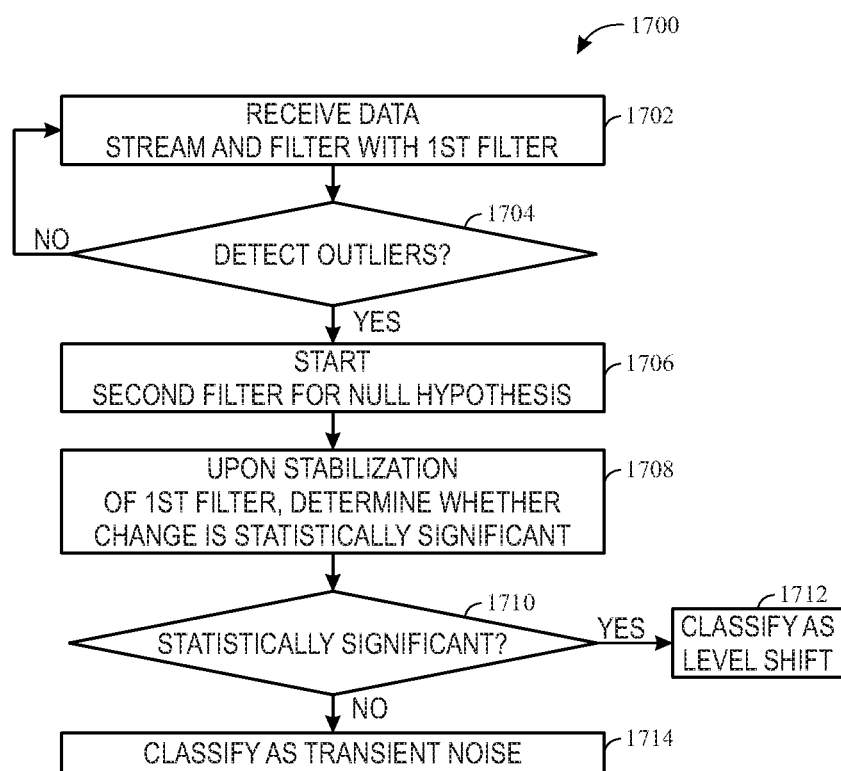
FIG. 17 is a flow chart illustrating a process for classifying anomalies, in accordance with an embodiment.

FIG. 17 illustrates an embodiment of a process 1700 for classifying anomalies. The process 1700 begins by receiving a data stream (e.g., metric stream 313 of FIG. 3) and filtering the stream with a first filter for outlier detection (block 1702). For example, a Kalman filter may be used to monitor the stream for outlier detection. The Kalman filter may use a series of measurements observed over time to produce estimates of unknown variables that tend to be more accurate than those based on a single measurement alone. The Kalman filters may use Bayesian inference and joint probability distribution estimation over the variables for each timeframe.

Figure 18:
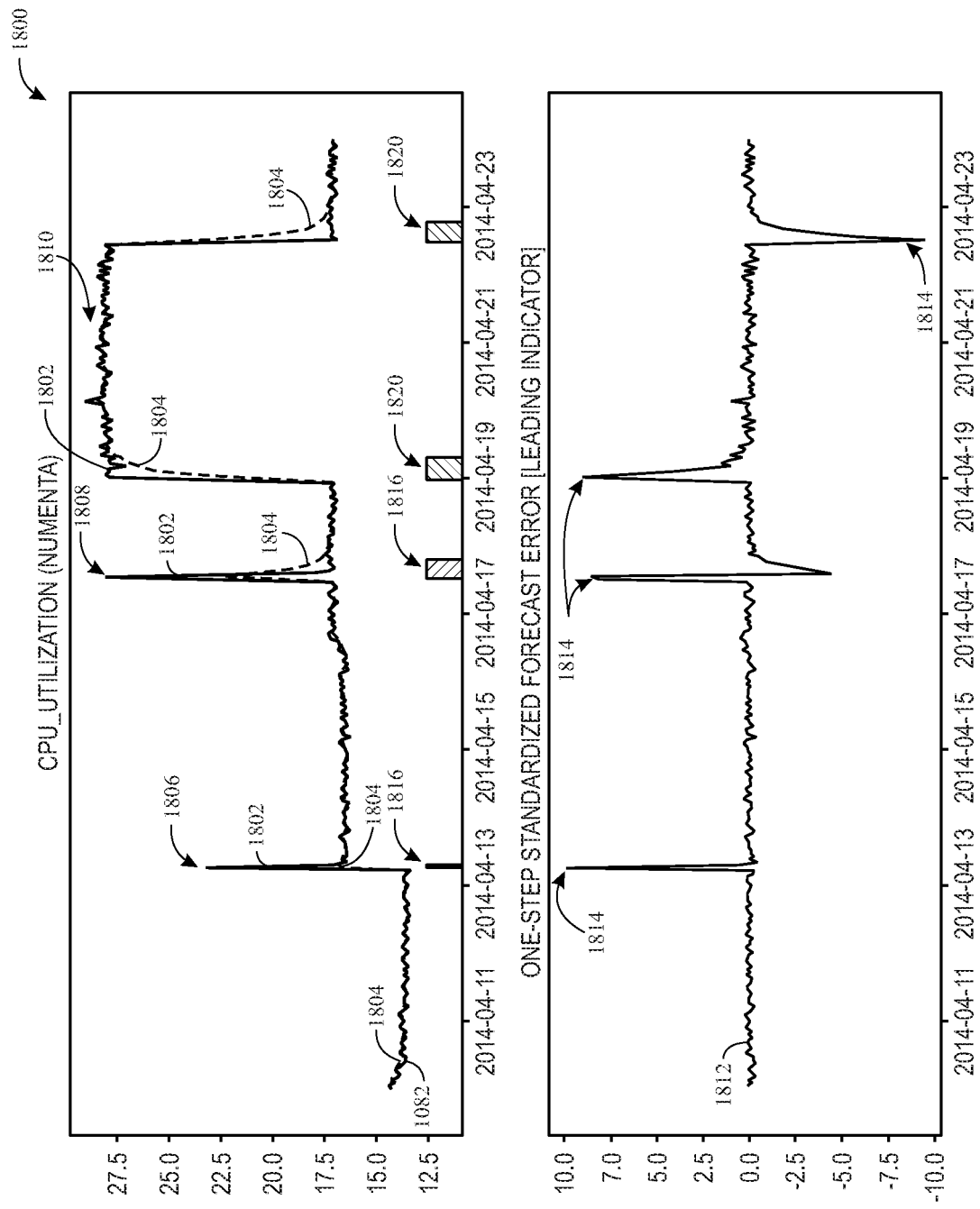
FIG. 18 is a line graph illustrating example anomaly classification, in accordance with an embodiment.

FIG. 18 provides data plots 1800 providing indicators for a stream of plotted data 1802 representative of a CPU utilization. Line 1804 represents the data after filtering by the first filter.

A determination is made as to whether outliers are detected in the stream (decision block 1704). For example, returning to FIG. 18, at spikes 1806 and 1808 and level shift 1810, outliers are detected, as indicated by the leading indicator 1812 at points 1814. Widths of the rectangles 1816 and 1820 illustrate a length between the detection of the outlier and re-stabilization of the data 1802.

When outliers are detected, a second filter is started, which represents the null hypothesis (e.g., that no outlier has occurred) (block 1706). Unobserved data that suggests that no outlier has occurred is fed into the second filter, enabling testing of a null hypothesis that no outlier has occurred.

Upon stabilization of the first filter, its (possibly new) level is computed and whether this level represents a statistically significant level shift is assessed using the second filter (block 1708). From there, a determination of the statistical significance of the change may be determined (decision block 1710).

For example, spike 1806 is level overshooting spike that results in a first filter detecting a significant change and starts a second filter. When the first filter stabilizes, the second filter notices a significant change between an old level (e.g., approximately 13) before the second filter was started and a new level after the second filter is started and the first filter stabilizes (e.g., approximately 17). Similarly, while spike 1810 does not include a level overshoot, it results in the first filter detecting a significant change and starts a second filter. When the first filter stabilizes, the second filter notices a significant change between an old level (e.g., approximately 17) and a new level (e.g., approximately 27). These statically significant changes indicate that the time-series may be classified as having undergone a level shift (block 1712).

In contrast, spike 1808 results in the first filter detecting a significant change and starts a second filter. When the first filter stabilizes, the second filter notices that the data 1802 returns to a stable state (e.g., there is no change or there is a statistically insignificant change between the old level (e.g., 17) and a new level (e.g., 17) after the first filter stabilization), as the data 1802 quickly returns to a previous level, as may be discerned from the second filter. These statically insignificant changes may be classified as a transient outlier and/or transient noise (block 1714).

A graphical user interface (GUI) may be used to provide the outlier classification for outliers as either a level shift and/or transient outliers. Returning to FIG. 18, a GUI may use a first variation (e.g., a lighter color) associated with the rectangle 1816 to indicate that the outlier is classified as transient noise. The GUI may use a second variation (e.g., a darker color) associated with rectangles 1816 and 1820 to indicate that the outlier is classified as a level shift.

Using the above-described techniques, a simple, yet accurate anomalous score and/or classification may be derived, providing an indication of anomalies experienced by CIs. By classifying time-series data related to the CIs, modeling the time-series data, and then identifying outliers and corresponding anomalies, an accurate state of the CIs may be reported to client devices, enabling more efficient reporting and/or response.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A system, comprising:
a distributed cache configured to store state information for a plurality of configuration items (CIs);
a plurality of management, instrumentation, and discovery (MID) servers forming a cluster, each of the plurality of MID servers comprising:
one or more processors, configured to execute machine-readable instructions;
a tangible, non-transitory, machine-readable medium, comprising the machine-readable instructions that, when executed by the one or more processors, cause a corresponding MID server to:
receive, from the distributed cache, a subset of the state information associated with assigned CIs; and
perform a statistical analysis on the subset of the state information; and
an anomaly detector, configured to:
identify statistical outliers of the statistical analysis; and
identify an anomaly of the statistical outliers by tracking a history of the statistical outliers; wherein the anomaly is determined based upon a magnitude of deviation between the subset of the state information and a statistical model;
a change detector, configured to:
identify the statistical outliers using a first filter applied to the subset of the state information, the first filter comprising a Kalman filter that produces estimates of unknown variables using Bayesian inference and joint probability distribution estimation over the unknown variables for a timeframe;
determine when a data transition associated with the statistical outliers indicates noise;
determine when the data transition associated with the statistical outliers indicates a level change, by
upon identifying the statistical outliers, feed data to a second filter that represents data indicative of no statistical outlier occurring;
upon stabilization of a change in the first filter, use an output of the second filter as a reference to determine is the change is statically significant;
when the change is statistically significant, classify the data transition associated with the statistical outliers as a level shift, and
otherwise, when the change is not statistically significant, classify the data transition associated with the statistical outliers as noise; and
when the data transition associated with the statistical outliers indicates the level change, present a notification of the level change.

2. The system of claim 1, wherein each of the MID servers comprises:
a time-series analyzer, configured to:
classify the subset of the state information into at least one of a plurality of classifications based at least in part upon historical time-series data; and
construct a statistical model representative of a stream of current time-series data based upon the at least one of the plurality of classifications;
an anomaly detector, configured to:
monitor the stream of current time-series data;
perform a statistical analysis on the stream of the current time-series data based at least in part upon the statistical model constructed by the time-series analyzer;
identify statistical outliers of the stream of the current time-series data based at least on the statistical analysis;
determine an anomalous score for the statistical outliers based at least on a history of the statistical outliers; wherein the anomalous score indicates a magnitude of deviation between the current time-series data and the statistical model; and
present the anomalous score to a client communicatively coupled to the system, for subsequent reporting, client action, or both.

3. A system comprising,
a distributed cache configured to store state information for a plurality of configuration items (CIs);
a plurality of management, instrumentation, and discovery (MID) servers forming a cluster, each of the plurality of MID servers comprising:
one or more processors, configured to execute machine-readable instructions;
a tangible, non-transitory, machine-readable medium, comprising the machine-readable instructions that, when executed by the one or more processors, cause a corresponding MID server to:
receive, from the distributed cache, a subset of the state information associated with assigned CIs; and
perform a statistical analysis on the subset of the state information; and
a time-series analyzer, configured to:
classify the subset of the state information into at least one of a plurality of classifications based at least in part upon historical time-series data; and
construct a statistical model representative of a stream of current time-series data based upon the at least one of the plurality of classifications;
an anomaly detector, configured to:
monitor the stream of current time-series data;
perform a statistical analysis on the stream of current time-series data based at least in part upon the statistical model constructed by the time-series analyzer;
identify statistical outliers of the stream of current time-series data based at least on the statistical analysis;
determine an anomalous score for the statistical outliers based at least on a history of the statistical outliers; wherein the anomalous score indicates a magnitude of deviation between the current time-series data and the statistical model; and
present the anomalous score to a client communicatively coupled to the system, for subsequent reporting, client action, or both;
wherein the plurality of classifications comprise:
a quasi-normal classification, indicating that the subset of the state information appears to adhere to a stationary process;
a seasonal classification, indicating that the subset of the state information appears to adhere to a process having periodic non-normal distribution, a general trend over time, or both;
a near-constant classification, indicating that the subset of the state information appears to adhere to a constant value;

a trendy classification, indicating that the subset of the state information comprises noisy data with a trend;

an accumulator classification, indicating that the subset of the state information comprises an accumulation of low-noise data;

a categorical classification, indicating that the subset of the state information appears to adhere to a process having a set of discrete values;

a switching classification, indicating that the subset of the state information appears to adhere to a process of jumping from at least one first state to at least one second state via one or more state transitions; and an arrival classification, indicating that the subset of the state information appears to adhere to a process dependent upon a timing of a particular event.

4. The system of claim 3, wherein the one or more processors determine whether the subset of the state information adheres to a weekly model or a daily model when the subset of the state information is seasonal.

5. The system of claim 4, wherein the one or more processors determine whether the subset of the state information adheres to the weekly model or the daily model by comparing a log-likelihood for a fit of the weekly model and the daily model to a fit threshold.

6. The system of claim 5, wherein the fit threshold is identified based upon Wilks' Theorem.

7. A tangible, non-transitory, machine-readable medium, comprising machine-readable instructions that, when executed by one or more processors, cause the one or more processors to:

receive a stream of current time-series data;

at periodic intervals, classify the stream of current time-series data into at least one of a plurality of classifications based at least in part upon historical time-series data;

identify a statistical model representative of the stream of current time-series data based upon the classification of the stream;

when the classification comprises a seasonal classification, identify the statistical model representative of the stream of current time-series data from a selection between a weekly statistical model and a daily statistical model; and perform a statistical analysis on the stream of the current time-series data based at least in part upon the statistical model, wherein the statistical model is constructed by a time-series analyzer;

identify a statistical outlier of the stream of the current time-series data based at least on the statistical analysis; and classify the statistical outlier as either noise or a level shift, by:

feeding unobserved data that that suggests that no statistical outlier has occurred into a filter;

determining, via filtering of the unobserved data by the filter, whether a data transition associated with the statistical outlier is statistically significant;

classifying the statistical outlier as a level shift when the data transition is statistically significant; and classifying the statistical outlier as noise when the data transition is not statistically significant; and provide a graphical indication of results of the statistical analysis at a communicatively coupled instance.

8. The machine-readable medium of claim 7, comprising instructions that, when executed by the one or more processors, cause the one or more processors to:

identify statistical outliers of the stream of the current time-series data based at least on the statistical analysis;

determine an anomalous score for the statistical outliers by tracking a history of the statistical outliers; wherein the anomalous score indicates a magnitude of deviation between the stream of current time-series data and the statistical model; and store the anomalous score, for subsequent reporting, client action, or both.

9. The machine-readable medium of claim 7, comprising instructions that, when executed by the one or more processors, cause the one or more processors to:

receive only a subset of the stream of the current time-series data associated with assigned configuration items (CIs).

10. A management, instrumentation, and discovery (MID) server, comprising:

one or more processors, configured to execute machine-readable instructions;

a tangible, non-transitory, machine-readable medium, comprising the machine-readable instructions that, when executed by the one or more, cause the MID server to:

receive a subset of a stream of current time-series data that is associated with assigned configuration items (CIs) of the MID server;

classify the subset of the stream of current time-series data as seasonal data;

select a statistical model representative of the subset of the stream of current time-series data from a selection between a weekly statistical model and a daily statistical model;

perform a statistical analysis on the stream of the current time-series data based at least in part upon the statistical model constructed by a time-series analyzer;

identify statistical outliers of the stream of the current time-series data based at least on the statistical analysis;

classify the statistical outliers as either transient or a level shift using a first Kalman filter; and when the statistical outliers are classified as transient, identify an anomaly from the statistical outliers by tracking a history of the statistical outliers using a second Kalman filter; wherein the anomaly is identified based upon a magnitude of deviation between the current time-series data and the statistical model.

11. The MID server of claim 10, wherein the machine-readable medium comprises machine-readable instructions that, when executed by the one or more processors:

cause the MID server to act as a redundant MID server for an offline MID server of a cluster comprising the MID server and the offline MID server.

12. The MID server of claim 10, comprising a System Center—Operations Manager (SCOM), a Representational State Transfer (REST) application-programming-interface (API), or both that is used to receive the subset of a stream of current time-series data from a distributed cache.

* * * * *